US011620330B2

(12) United States Patent
Tomar et al.

(10) Patent No.: US 11,620,330 B2
(45) Date of Patent: Apr. 4, 2023

(54) CLASSIFYING IMAGE STYLES OF IMAGES BASED ON IMAGE STYLE EMBEDDINGS

(71) Applicant: ADOBE INC., San Jose, CA (US)

(72) Inventors: Devavrat Tomar, Ecublens Vaud (CH); Aliakbar Darabi, Newcastle, WA (US)

(73) Assignee: ADOBE INC., San Jose, CA (US)

( * ) Notice: Subject to any disclaimer, the term of this patent is extended or adjusted under 35 U.S.C. 154(b) by 399 days.

(21) Appl. No.: 16/897,008

(22) Filed: Jun. 9, 2020

(65) Prior Publication Data

US 2021/0382936 A1    Dec. 9, 2021

(51) Int. Cl.
*G06F 16/55*   (2019.01)
*G06F 16/583*  (2019.01)
*G06N 3/08*    (2023.01)
*G06N 20/00*   (2019.01)
*G06K 9/62*    (2022.01)
*G06V 10/44*   (2022.01)

(52) U.S. Cl.
CPC .......... *G06F 16/55* (2019.01); *G06F 16/5854* (2019.01); *G06K 9/6256* (2013.01); *G06N 3/08* (2013.01); *G06N 20/00* (2019.01); *G06V 10/443* (2022.01)

(58) Field of Classification Search
CPC ................ G06F 16/55; G06F 16/5854; G06K 9/6256; G06N 3/08; G06N 20/00; G06N 3/0454; G06N 3/088; G06V 10/443; G06V 10/761
USPC ....................................................... 382/224
See application file for complete search history.

(56) References Cited

U.S. PATENT DOCUMENTS

2021/0073593 A1*  3/2021  Aggarwal ........... G06F 16/5854

OTHER PUBLICATIONS

Gatys, L. A., Ecker, A. S., & Bethge, M. (2016). Image style transfer using convolutional neural networks. In Proceedings of the IEEE conference on computer vision and pattern recognition (pp. 2414-2423).
Photoshop actions from graphic river. Graphicriver. Retrieved from the Internet on Sep. 9, 2020 from URL <https://graphicrivernet/add-ons/photoshop/actions> Accessed: Sep. 30, 2010.
Showcase & discover creative work. Behance. Retrieved from the Internet on Sep. 9, 2020 from URL <https://www.behance.net/> Accessed: Sep. 30, 2010.
Gatys, L. A., Ecker, A. S., & Bethge, M. (2015). A neural algorithm of artistic style. arXiv preprint arXiv:1508.06576.

(Continued)

*Primary Examiner* — Amandeep Saini
(74) *Attorney, Agent, or Firm* — Shook, Hardy & Bacon L.L.P.

(57) ABSTRACT

Various disclosed embodiments are directed to classify or determining an image style of a target image according to a consumer application based on determining a similarity score between the image style of a target image and one or more other predetermined image styles of the consumer application. Various disclosed embodiments can resolve image style transfer destructiveness functionality by making various layers of predetermined image styles modifiable. Further various embodiments resolve tedious manual user input requirements and reduce computing resource consumption, among other things.

20 Claims, 15 Drawing Sheets

(56) References Cited

OTHER PUBLICATIONS

Huang, X., & Belongie, S. (2017). Arbitrary style transfer in real-time with adaptive instance normalization. In Proceedings of the IEEE International Conference on Computer Vision (pp. 1501-1510).
Chen, D., Yuan, L., Liao, J., Yu, N., & Hua, G. (2017). Stylebank: An explicit representation for neural image style transfer. In Proceedings of the IEEE conference on computer vision and pattern recognition (pp. 1897-1906).
Zhu, J. Y., Park, T., Isola, P., & Efros, A. A. (2017). Unpaired image-to-image translation using cycle-consistent adversarial networks. In Proceedings of the IEEE international conference on computer vision (pp. 2223-2232).
Szegedy, C., Vanhoucke, V., Ioffe, S., Shlens, J., & Wojna, Z. (2016). Rethinking the inception architecture for computer vision. In Proceedings of the IEEE conference on computer vision and pattern recognition (pp. 2818-2826).
Maaten, L. V. D., & Hinton, G. (2008). Visualizing data using t-SNE. Journal of machine learning research, 9(Nov), 2579-2605.

* cited by examiner

600

| Inception v3 (Layer1 to Layer 13) | | |
|---|---|---|
| Layer (type) | Output Shape | Param # |
| Conv2d-1 | [-1, 32, 124, 124] | 864 |
| BatchNorm2d-2 | [-1, 32, 124, 124] | 64 |
| Conv2d-4 | [-1, 32, 122, 122] | 9,216 |
| BatchNorm2d-5 | [-1, 32, 122, 122] | 64 |
| Conv2d-7 | [-1, 64, 122, 122] | 18,432 |
| BatchNorm2d-8 | [-1, 64, 122, 122] | 128 |
| Conv2d-10 | [-1, 80, 122, 122] | 5,120 |
| BatchNorm2d-11 | [-1, 80, 122, 122] | 160 |
| Conv2d-13 | [-1, 192, 120, 120] | 138,240 |
| BatchNorm2d-14 | [-1, 192, 120, 120] | 384 |
| Conv2d-16 | [-1, 64, 120, 120] | 12,288 |
| BatchNorm2d-17 | [-1, 64, 120, 120] | 128 |
| Conv2d-19 | [-1, 48, 120, 120] | 9,216 |
| BatchNorm2d-20 | [-1, 48, 120, 120] | 96 |
| Conv2d-22 | [-1, 64, 120, 120] | 76,800 |
| BatchNorm2d-23 | [-1, 64, 120, 120] | 128 |
| Conv2d-25 | [-1, 64, 120, 120] | 12,288 |
| BatchNorm2d-26 | [-1, 64, 120, 120] | 128 |
| Conv2d-28 | [-1, 96, 120, 120] | 55,296 |
| BatchNorm2d-29 | [-1, 96, 120, 120] | 192 |
| Conv2d-31 | [-1, 96, 120, 120] | 82,944 |
| BatchNorm2d-32 | [-1, 96, 120, 120] | 192 |
| Conv2d-34 | [-1, 32, 120, 120] | 6,144 |
| BatchNorm2d-35 | [-1, 32, 120, 120] | 64 |
| InceptionA-37 | | |
| Conv2d-38 | [-1, 64, 120, 120] | 16,384 |
| BatchNorm2d-39 | [-1, 64, 120, 120] | 128 |
| Conv2d-41 | [-1, 48, 120, 120] | 12,288 |
| BatchNorm2d-42 | [-1, 48, 120, 120] | 96 |
| Conv2d-44 | [-1, 64, 120, 120] | 76,800 |
| BatchNorm2d-45 | [-1, 64, 120, 120] | 128 |
| Conv2d-47 | [-1, 64, 120, 120] | 16,384 |
| BatchNorm2d-48 | [-1, 64, 120, 120] | 128 |
| Conv2d-50 | [-1, 96, 120, 120] | 55,296 |
| BatchNorm2d-51 | [-1, 96, 120, 120] | 192 |
| Conv2d-53 | [-1, 96, 120, 120] | 82,944 |
| BatchNorm2d-54 | [-1, 96, 120, 120] | B192 |
| Conv2d-56 | [-1, 64, 120, 120] | 16,384 |
| BatchNorm2d-57 | [-1, 64, 120, 120] | 128 |
| InceptionA-59 | | |
| Conv2d-60 | [-1, 64, 120, 120] | 18,432 |
| BatchNorm2d-61 | [-1, 64, 120, 120] | 128 |
| Conv2d-63 | [-1, 48, 120, 120] | 13,824 |
| BatchNorm2d-64 | [-1, 48, 120, 120] | 96 |
| Conv2d-66 | [-1, 64, 120, 120] | 76,800 |
| BatchNorm2d-67 | [-1, 64, 120, 120] | 128 |
| Conv2d-69 | [-1, 64, 120, 120] | 18,432 |
| BatchNorm2d-70 | [-1, 64, 120, 120] | 128 |
| Conv2d-72 | [-1, 96, 120, 120] | 55,296 |
| BatchNorm2d-73 | [-1, 96, 120, 120] | 192 |
| Conv2d-75 | [-1, 96, 120, 120] | 82,944 |
| BatchNorm2d-76 | [-1, 96, 120, 120] | 192 |
| Conv2d-78 | [-1, 64, 120, 120] | 18,432 |
| BatchNorm2d-79 | [-1, 64, 120, 120] | 128 |

*FIG. 6A.*

|  |  |  |
|---|---|---|
| ⋮ | ⋮ | ⋮ |
|  | InceptionA-81 |  |
| Conv2d-82 | [-1, 384, 59, 59] | 995,328 |
| BatchNorm2d-83 | [-1, 384, 59, 59] | 768 |
| Conv2d-85 | [-1, 64, 120, 120] | 18,432 |
| BatchNorm2d-86 | [-1, 64, 120, 120] | 128 |
| Conv2d-88 | [-1, 96, 120, 120] | 55,296 |
| BatchNorm2d-89 | [-1, 96, 120, 120] | 192 |
| Conv2d-91 | [-1, 96, 59, 59] | 82,944 |
| BatchNorm2d-92 | [-1, 96, 59, 59] | 192 |
|  | InceptionB-94 |  |
| Conv2d-95 | [-1, 192, 59, 59] | 147,456 |
| BatchNorm2d-96 | [-1, 192, 59, 59] | 384 |
| Conv2d-98 | [-1, 128, 59, 59] | 98,304 |
| BatchNorm2d-99 | [-1, 128, 59, 59] | 256 |
| Conv2d-101 | [-1, 128, 59, 59] | 114,688 |
| BatchNorm2d-102 | [-1, 128, 59, 59] | 256 |
| Conv2d-104 | [-1, 192, 59, 59] | 172,032 |
| BatchNorm2d-105 | [-1, 192, 59, 59] | 384 |
| Conv2d-107 | [-1, 128, 59, 59] | 98,304 |
| BatchNorm2d-108 | [-1, 128, 59, 59] | 256 |
| Conv2d-110 | [-1, 128, 59, 59] | 114,688 |
| BatchNorm2d-111 | [-1, 128, 59, 59] | 256 |
| Conv2d-113 | [-1, 128, 59, 59] | 114,688 |
| BatchNorm2d-114 | [-1, 128, 59, 59] | 256 |
| Conv2d-116 | [-1, 128, 59, 59] | 114,688 |
| BatchNorm2d-117 | [-1, 128, 59, 59] | 256 |
| Conv2d-119 | [-1, 192, 59, 59] | 172,032 |
| BatchNorm2d-120 | [-1, 192, 59, 59] | 384 |
| Conv2d-122 | [-1, 192, 59, 59] | 147,456 |
| BatchNorm2d-123 | [-1, 192, 59, 59] | 384 |
|  | InceptionC-125 |  |
| Conv2d-126 | [-1, 192, 59, 59] | 147,456 |
| BatchNorm2d-127 | [-1, 192, 59, 59] | 384 |
| Conv2d-129 | [-1, 160, 59, 59] | 122,880 |
| BatchNorm2d-130 | [-1, 160, 59, 59] | 320 |
| Conv2d-132 | [-1, 160, 59, 59] | 179,200 |
| BatchNorm2d-133 | [-1, 160, 59, 59] | 320 |
| Conv2d-135 | [-1, 192, 59, 59] | 215,040 |
| BatchNorm2d-136 | [-1, 192, 59, 59] | 384 |
| Conv2d-138 | [-1, 160, 59, 59] | 122,880 |
| BatchNorm2d-139 | [-1, 160, 59, 59] | 320 |
| Conv2d-141 | [-1, 160, 59, 59] | 179,200 |
| BatchNorm2d-142 | [-1, 160, 59, 59] | 320 |
| Conv2d-144 | [-1, 160, 59, 59] | 179,200 |
| BatchNorm2d-145 | [-1, 160, 59, 59] | 320 |
| Conv2d-147 | [-1, 160, 59, 59] | 179,200 |
| BatchNorm2d-148 | [-1, 160, 59, 59] | 320 |
| Conv2d-150 | [-1, 192, 59, 59] | 215,040 |
| BatchNorm2d-151 | [-1, 192, 59, 59] | 384 |
| Conv2d-153 | [-1, 192, 59, 59] | 147,456 |
| BatchNorm2d-154 | [-1, 192, 59, 59] | 384 |
| ⋮ | ⋮ | ⋮ |

*FIG. 6B.*

| Layer (type) | Output Shape | Param # |
|---|---|---|
| ⋮ | ⋮ | ⋮ |
| Conv2d-157 | [-1, 192, 59, 59] | 147,456 |
| BatchNorm2d-158 | [-1, 192, 59, 59] | 384 |
| Conv2d-160 | [-1, 160, 59, 59] | 122,880 |
| BatchNorm2d-1610 | [-1, 160, 59, 59] | 320 |
| Conv2d-163 | [-1, 160, 59, 59] | 179,200 |
| BatchNorm2d-164 | [-1, 160, 59, 59] | 320 |
| Conv2d-166 | [-1, 192, 59, 59] | 215,040 |
| BatchNorm2d-167 | [-1, 192, 59, 59] | 384 |
| Conv2d-169 | [-1, 160, 59, 59] | 122,880 |
| BatchNorm2d-170 | [-1, 160, 59, 59] | 320 |
| Conv2d-172 | [-1, 160, 59, 59] | 179,200 |
| BatchNorm2d-173 | [-1, 160, 59, 59] | 320 |
| Conv2d-175 | [-1, 160, 59, 59] | 179,200 |
| BatchNorm2d-176 | [-1, 160, 59, 59] | 320 |
| Conv2d-178 | [-1, 160, 59, 59] | 179,200 |
| BatchNorm2d-179 | [-1, 160, 59, 59] | 320 |
| Conv2d-181 | [-1, 192, 59, 59] | 215,040 |
| BatchNorm2d-182 | [-1, 192, 59, 59] | 384 |
| Conv2d-184 | [-1, 192, 59, 59] | 147,456 |
| BatchNorm2d-185 | [-1, 192, 59, 59] | 384 |
| InceptionC-187 | | |
| Conv2d-188 | [-1, 192, 59, 59] | 147,456 |
| BatchNorm2d-189 | [-1, 192, 59, 59] | 384 |
| Conv2d-191 | [-1, 192, 59, 59] | 147,456 |
| BatchNorm2d-192 | [-1, 192, 59, 59] | 384 |
| Conv2d-194 | [-1, 192, 59, 59] | 258,048 |
| BatchNorm2d-195 | [-1, 192, 59, 59] | 384 |
| Conv2d-197 | [-1, 192, 59, 59] | 258,048 |
| BatchNorm2d-198 | [-1, 192, 59, 59] | 384 |
| Conv2d-200 | [-1, 192, 59, 59] | 147,456 |
| BatchNorm2d-201 | [-1, 192, 59, 59] | 384 |
| Conv2d-203 | [-1, 192, 59, 59] | 258,048 |
| BatchNorm2d-204 | [-1, 192, 59, 59] | 384 |
| Conv2d-206 | [-1, 192, 59, 59] | 258,048 |
| BatchNorm2d-207 | [-1, 192, 59, 59] | 384 |
| Conv2d-209 | [-1, 192, 59, 59] | 258,048 |
| BatchNorm2d-210 | [-1, 192, 59, 59] | 384 |
| Conv2d-212 | [-1, 192, 59, 59] | 258,048 |
| BatchNorm2d-213 | [-1, 192, 59, 59] | 384 |
| Conv2d-215 | [-1, 192, 59, 59] | 147,456 |
| BatchNorm2d-216 | [-1, 192, 59, 59] | 384 |
| InceptionC-218 | | |

Fully Connected Layers

| Layer (type) | Output Shape | Param # |
|---|---|---|
| Linear-219 | [-1, 100] | 76,900 |
| Linear-220 | [100, 40] | 4,040 |

*FIG. 6C.*

CLASSIFYING IMAGE STYLES OF IMAGES BASED ON IMAGE STYLE EMBEDDINGS

BACKGROUND

Various technologies render media (e.g., photographic images) or provide varied functionality associated with media. For example, media editing software (e.g., Adobe® Photoshop®, Adobe After Effects®, and Adobe Premiere®) provide tools (e.g., cut, paste, select) to users so that they can modify visual data of digital images and video. However, these software applications and other technologies generally lack the functionality to adequately classify unseen image styles of images according to other image styles used in these software applications, among other things. "Image style" typically refers to the manner in which the content of images are generated, as opposed to the content itself. For example, image style can refer to the color, lighting, shading, texture, line patterns, fading or other image effects of an object representing the content. Moreover, these technologies are complex, require extensive manual user input to apply image styles to an image, and consume an unnecessary amount of computer resources (e.g., disk I/O).

Some advancements in software and hardware platforms have led to technologies that can transfer image styles from one image to another. Despite these advances, machine learning systems and other image transfer systems suffer from a number of disadvantages, particularly in terms of their destructive functionality. When particular image transfer style technologies apply image styles to other images, they typically apply wholesale changes to the other images in a single forward pass. This is destructive because the user typically has no control over different layers of the image style transferred.

SUMMARY

One or more embodiments described herein provide benefits and solve one or more of the foregoing or other problems in existing technology with methods, systems, and non-transitory computer readable media that classify or determine an image style of a target image according to a consumer application based on determining a similarity score between the image style of the target image and one or more other predetermined image styles of the consumer application. Various disclosed embodiments can resolve image style transfer destructiveness functionality by making various layers of predetermined image styles modifiable. Further, various embodiments resolve tedious manual user input requirements and reduce computing resource consumption, among other things.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The present invention is described in detail below with reference to the attached drawing figures, wherein:

FIGS. 6A, 6B, and 6C is a full schematic of the model used for the experimental results of FIG. 5, according to some embodiments.

DETAILED DESCRIPTION

Overview

Figure 1:
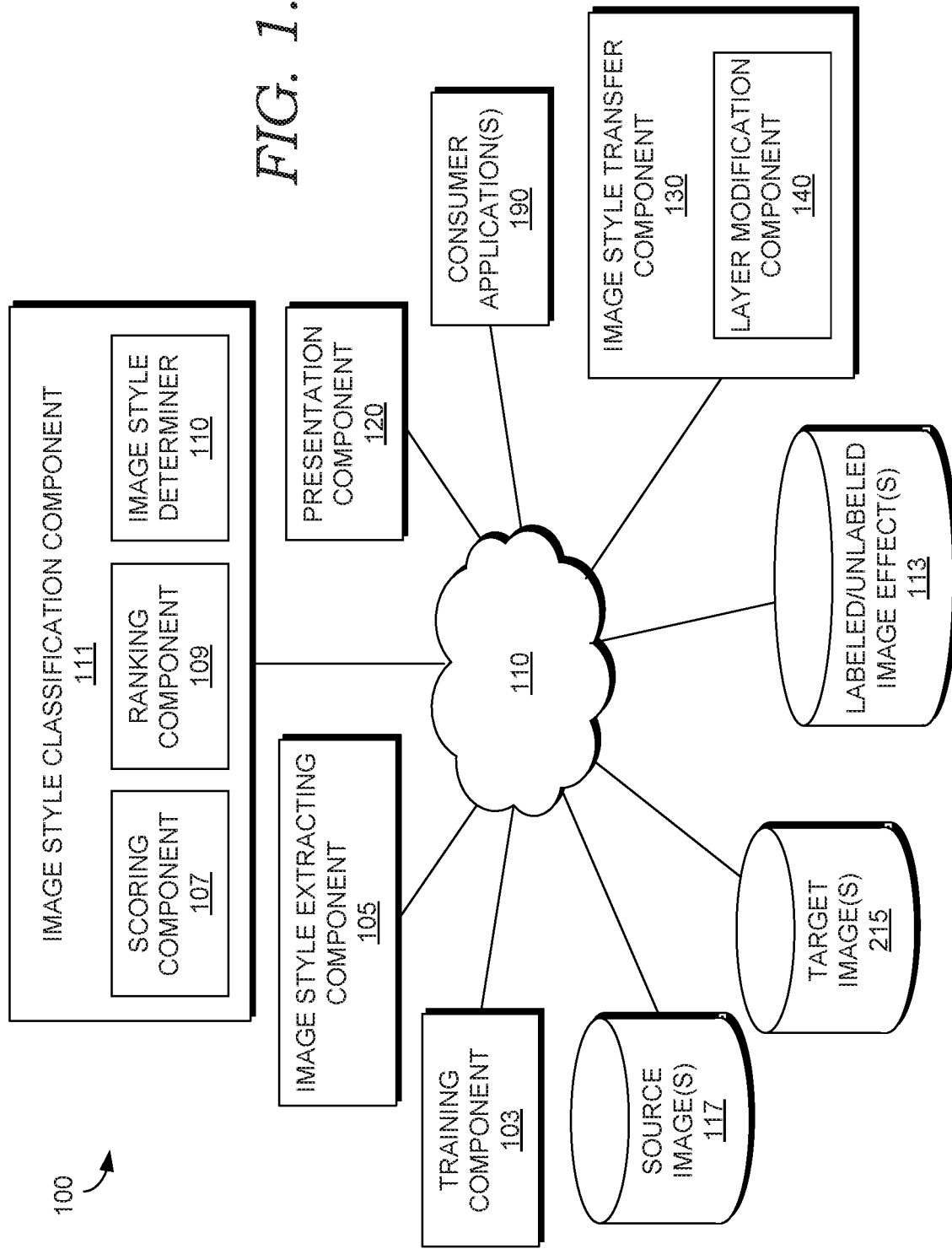
FIG. 1 is a block diagram of a computing system architecture in which aspects of the present disclosure are employed, according to some embodiments.

Users are often inspired by the style (e.g., a Van Gogh impasto style) of a particular artwork or photograph and want to achieve a similar effect on an image. However, because existing technologies are complex and require extensive and manual user input, achieving a similar effect is difficult if not impossible. For example, some media software editing applications require users to manually scroll through multiple pages of image effects and the user must select one that the user thinks is closest to the desired image effect to apply to a given image. This is very arduous and time consuming for users. Although some software applications include tutorials or assistant functionality, they are often not helpful and still require a great deal of mastery before the user can apply a given image effect to an image. Moreover, users often cannot pinpoint or replicate what exactly they like about the style of an image so these tutorials or assistants may not be helpful.

Existing image style transfer technologies are also deficient. Although particular image style transfer technologies can apply image styles to other images, they are destructive, among other things. For instance, some deep learning algorithms perform style transfer based on manipulating the node activations of a deep learning model (e.g. iterative gradient descent of Gaytes), or doing so in a single forward pass (e.g., AdaIN, Cylcle-GAN). What this means is that all the pixel manipulations indicative of various layers of an image effect are aggregated into a single layer. Accordingly, users have no control over any of the pixel manipulations of the image effect. For example, although particular image style transfer technologies can apply a particular foreground color (a first layer) and a particular background color (a second layer) to a photograph, users are not able to modify (e.g., cut, past, apply brushes) either the first layer or the second layer.

Embodiments of the present invention improve these existing technologies through new functionality, as described herein. Various embodiments relate to classifying or determining image styles based at least in part on a comparison with other predetermined image styles. In this way, users can easily select and apply a predetermined image style(s) to a source image that is closest in image style to extracted features of a target image representing image style. In operation, some embodiments extract one or more features from one or more portions of a target image (e.g., an image that includes an image style that the user likes). These one or more features may correspond to an image style of the target image, as opposed to the content of the target image. For example, some embodiments extract the line texture or shading patterns from the target image that make up the content of the target image.

In further operation, some embodiments compare the one or more features with a plurality of predetermined image styles (e.g., existing "PHOTOSHOP actions"). Based on the comparing, particular embodiments generate a similarity score for each predetermined image style of the plurality of image styles. In various embodiments, the similarity score is indicative of a measure of similarity between the one or more features and each predetermined image style of the plurality of predetermined image styles. In an illustrative example of the generating a similarity score, some embodiments convert (e.g., via a deep learning machine learning model) the one or more features (e.g., the line texture and shading patterns) into a feature vector (e.g., a vector of numbers that represent the one or more features) that is embedded in feature space. In some embodiments, each of the plurality of predetermined image styles are also represented by a feature vector in the feature space. Accordingly, some embodiments determine a distance (e.g., a Euclidian distance) between the feature vector that represents the one or more features of the image style of the target image and each feature vector that represents each predetermined image style. Therefore, the closer in distance that any feature vector that represents a given predetermined image style is to the feature vector that represents the one or more features, the higher the similarity score. For example, a first feature vector representing a "water color" predetermined image style is scored higher than a second feature vector representing a "pencil drawing" predetermined image style based on the feature vector representing the target image being closer to or more indicative of the water color style than the pencil drawing style.

Some embodiments rank each predetermined image style of the plurality of image styles. For example, using the scoring illustration above, particular embodiments rank the "water color" predetermined image style higher than the "pencil drawing" predetermined image style. Some embodiments present, to computing device associated with the user, an indication of one or more of the plurality of predetermined image styles based at least in part on this ranking. For example, some embodiments present an identifier representing the "water color" predetermined image style in a first position (e.g., at the top of a results page) corresponding a highest rank and further presents another identifier representing the "pencil drawing" predetermined image style in a second position (e.g., below the "water color" predetermined image style) corresponding to lowest rank. In this way, the user can easily see which predetermined image style is the most similar to the one or more portions of the target image and select which predetermined image style the user wants to apply to a source image.

Various embodiments of the present disclosure improve existing media rendering and media software editing applications because they do not require extensive manual user input. For example, particular embodiments present predetermined image styles for users to apply to source images based on new functionality or set of rules, as opposed to requiring extensive manual user input. As stated above, existing technologies require extensive and arduous manual user input, which requires extensive scrolling on a page, drilling down to different views/pages, or the like. However, particular embodiments of the present disclosure do not require extensive manual user input but automatically (e.g., without an explicit user request) determine the predetermined image style that is closest to or looks most similar to the image style of the target image (or one or more portions of the target image). Specifically, some embodiments automatically extract features of target image based on a user request, automatically generate a similarity score, and/or automatically present the predetermined image styles to the user, thereby relieving the user of an unnecessary amount manual user input. This not only improves the functionality of existing technologies, but also improves the user interfaces of these technologies because the user does not have to perform extensive drilling down or scrolling to find matching predetermined image styles.

Various embodiments also improve existing image style transfer technologies. For example, while various embodiments can apply or transfer image style from an image with a predetermined image style to a source image, these embodiments are not destructive. That is, the predetermined image style (or effect) is applied in a procedural manner (in steps or processes) inside image editing software or other consumer applications and each individual step can be manipulated to change the overall image style effect such that they are fully editable. In this way, the user has full control over the image effect. For example, at a first time a first process can add the background layer of a predetermined image style to a source image and the user can subsequently modify (e.g., cut, add features to, delete) the background layer on the source image. At a second time subsequent to the first time, a second process can add a foreground layer of the same predetermined image style to the source image and the user can subsequently modify the foreground layer. Accordingly, various embodiments do not aggregate all the pixel manipulations of an image effect into a single pass or layer. Rather, they procedurally add pixel manipulations such that each manipulation can be fully editable by users.

Moreover, some embodiments improve computing resource consumption, such as I/O and network costs. As described above, existing technologies require users to scroll through, drill down, issue multiple queries, or otherwise make repeated selections before the user obtains an image effect the user desires to apply to a source image. This can increase storage device I/O (e.g., excess physical read/write head movements on non-volatile disk) because each time a user makes these selections, the system often has to repetitively reach out to the storage device to perform read/write operations, which is time consuming, error prone, and can eventually wear on components, such as a read/write head. Additionally, with session or network-based web applications, each user input may require packet generation costs (e.g., input header information) for network protocols (e.g., TCP/IP), which may increase network latency after repeated selections being transmitted over a network. For instance, each time a user clicks on a page of image effect results or issues a different query to obtain a different image style candidate, packet headers may have to be exchanged and the payload of the data has to traverse the network. Further, if users repetitively issue queries to get the desired image style, it is computationally expensive. For example, an optimizer engine of a database manager module calculates a query execution plan (e.g., calculates cardinality, selectivity, etc.) each time a query is issued, which requires a database manager to find the least expensive query execution plan to fully execute the query. This decreases throughput and increases network latency, and can waste valuable time. Most database relations contain hundreds if not thousands of records. Repetitively calculating query execution plans to obtain the desired image effect on this quantity of rows decreases throughput and increases network latency.

Definitions

Various terms are used throughout, some of which are described below:

In some embodiments, a "target image" is any image from which an image style (or features indicative of an image style) is extracted from. In various instances, the target image includes an image style that is the target for which particular embodiments engage in finding one or more similar predetermined image styles. For example, embodiments can receive a user request to locate a predetermined image style that is similar to an image style of one or more portions of the target image. An "image" as described herein is a visual representation of one or more portions of the real world or a visual representation of one or more documents. For example, an image can be a digital photograph, a digital image among a sequence of video segments, a graphic image file (e.g., JPEG, PNG, etc.), a picture (or sub-element of a picture), and/or a bitmap among other things.

In some embodiments and as described herein, an "image style" or "image effect" typically refers to the manner in which the content of images are generated or styled, as opposed to the content itself. For example, image style may refer to the shading, texture, lighting or any other effect on all objects in an image. In various instances, any objects detected or detectable (e.g., via an object recognition component) in an image correspond to the content or payload of an image, whereas the pattern of all actual pixel values in the target image (or selected portion(s) of the target image) correspond to the image style. It is understood that sometimes image content and image style are not completely disentangled. Accordingly, in some embodiments where neural networks are used, "image style" additionally or alternatively refers to the feature correlations of lower layers of a neural network. The higher layers in a neural network capture the high-level content in terms of objects and their arrangement in the target image but do not strictly constrain the exact pixel values of the reconstruction. In contrast, reconstructions from the lower layers reproduce the exact pixel values of the target image—i.e., the image style.

In some embodiments, a "predetermined image style" or "predetermined image effect" refers to an image style or image effect that already exists, has already been classified or labeled (e.g., via a deep neural network), and/or is already stored in memory. Various embodiments locate predetermined image styles similar to unseen/non-analyzed image styles extracted from the target image so that the user can apply any one of the similar predetermined image styles to a source image, as described herein. In some embodiments, a predetermined image style is a set of generated procedural effects, which is indicative of a procedural texture created using an algorithm (e.g., fractal noise and turbulence functions), rather than directly stored data. For example, a predetermined image style can be or represent a PHOTOSHOP action, as described herein.

In some embodiments, a "source image" is any image that one or more predetermined image styles are applied to or superimposed over. For example, a user may upload a source image of a painting. After embodiments locate and present predetermined image styles similar to the extracted image style from the target image, the user can select one of the predetermined image styles after which particular embodiments apply the predetermined image style to the source image of the painting.

In various embodiments, a "similarity score" refers to a measure of similarity between one or more features representing the image style extracted from the target image and one or more predetermined image styles. For example, the measure of similarity can be in terms of an integer or other real number difference where the one or more features and the predetermined image styles are represented as real number values (e.g., feature vectors). Alternatively or additionally, the measure of similarity can correspond to the actual distance (e.g., Euclidian distance) value between feature vectors representing the image styles in feature space, as described in more detail herein.

In various embodiments, an "indication" as described herein refers to any representation of data (e.g., feature vector, hash value, token, identifier, etc.) or the data/payload itself. In an illustrative example of "representation" aspects, some embodiments present an indication of a predetermined image style to users, which may be an identifier that describes the predetermined image style but is not the predetermined image style itself. In another example, some embodiments determine a distance between indications (e.g., feature vectors) representing predetermined images and another indication (another feature vector) representing an image style of a target image. Alternatively, some embodiments compare the predetermined image styles themselves with one or more features themselves representing the image style of the target image.

The term "machine learning model" refers to a model that is used for machine learning tasks or operations. In various embodiments, a machine learning model can receive an input (e.g., a target image) and, based on the input, identify patterns or associations in order to predict a given output (e.g., predict that the image style of the target image is of a certain class). Machine learning models can be or include any suitable model, such as one or more: neural networks (e.g., CNN), word2Vec models, Bayesian networks, Random Forests, Boosted Trees, etc. "Machine learning" as described herein, and in particular embodiments, corresponds to algorithms that parse or extract features of historical data (e.g., instances of documents), learn (e.g., via training) about the historical data by making observations or identifying patterns in data, and then receive a subsequent input (e.g., a current target image) in order to make a determination, prediction, and/or classification of the subsequent input based on the learning without relying on rules-based programming (e.g., conditional statement rules).

In various embodiments, the terms "deep embedding neural network," "deep learning model," or "deep neural network" refers to a specific type of neural network machine learning model is capable of embedding feature vectors representing features in feature space based on similarity or distance (e.g., Euclidean distance, cosine distance, Hamming distance, etc.). For example, these terms can refer to a Convolutional Neural Network (CNN) (e.g., an inception v3 model), Recurrent Neural Networks (RNN) (e.g., LSTM), Recursive Neural Networks, Unsupervised Pretrained Networks (e.g., Deep belief Networks (DBN), or the like.

Exemplary System

Referring now to FIG. 1, a block diagram is provided showing aspects of an example computing system architecture suitable for implementing an embodiment of the disclosure and designated generally as the system 100. The system 100 represents only one example of a suitable computing system architecture. Other arrangements and elements can be used in addition to or instead of those shown, and some elements may be omitted altogether for the sake of clarity. Further, many of the elements described herein are functional entities that may be implemented as discrete or distributed components or in conjunction with other components, and in any suitable combination and location. For example, some or each of the components of the system may be located within a single computing device (e.g., the computing device 1000 of FIG. 10). Alternatively, some or each of the components may be distributed among various computing devices, such as in a distributed cloud computing environment. In some embodiments, the system 100 and each of the components are located within the server and/or user device of FIG. 12, as described in more detail herein.

The system 100 includes network 110, which is described in connection to FIG. 9, and which communicatively couples components of system 100, including the training component 103, the image style extracting component 105, the image style classification component 111, the presentation component 120, the image style transfer component 130, the labeled/unlabeled image effects 113, the target image(s) 115, and the source image(s) 117. The components of the system 100 may be embodied as a set of compiled computer instructions or functions, program modules, computer software services, logic gates, or an arrangement of processes carried out on one or more computer systems.

The system 100 generally operates to classify or predict a given image style of a given target image so that users can easily match or locate preexisting image styles to apply to a source image. The training component 103 is generally responsible for training a set of predetermined image styles (i.e., the unlabeled/labeled image effects 113) so that various image style features of the predetermined image styles are learned or weighted by a machine learning model. In this way, for example, when one or more portions of a target image are compared against the trained predetermined image styles (e.g., by the scoring component 107), features of the target image can be matched or scored relative to features trained via the machine learning model.

Various embodiments input various different predetermined image styles as training data. These examples may be generated by applying the procedural image effects on arbitrary many images or can be collected from publicly available dataset e.g. oil painting dataset, cartoon, etc.). Embodiments can learn the parameters of the machine learning model so that the examples from similar image effects are closer to each other in the style embedding feature space. In some embodiments, this training is done in supervised manner using Cross entropy loss function (e.g., when number of class are not huge) or other clustering based loss function (e.g. Triplet loss or GE2E loss (https://arxiv.org/abs/1710.10467) that try to map similar styled images into one cluster. Once the model is trained, embodiments can represent a predetermined image style in the style embedding space by aggregating (e.g. mean/median) the style features of the predetermined image-style applied on different images obtained by passing these images through the trained model. For example, in supervised learning contexts, the training component 103 can receive user input that contains an image and indicates specific labels representing the image styles, such as "water color" style, "oil painting" style, "stippling effect" style, "Van Gogh" style, and the like. Embodiments, can then run the predetermined image styles with the corresponding labels through a machine learning model so that different feature values are learned according to the label.

In some embodiments, the training component 103 learns features of the predetermined image styles or unlabeled/labeled image effects 113 and responsively weights them during training. A "weight" in various instances represents the importance or significant of a feature or feature value for classification or prediction. For example, each feature may be associated with an integer or other real number where the higher the real number, the more significant the feature is for its label or classification. In some embodiments, a weight in a neural network or other machine learning application can represent the strength of a connection between nodes or neurons from one layer (an input) to the next layer (an output). A weight of 0 may mean that the input will not change the output, whereas a weight higher than 0 changes the output. The higher the value of the input or the closer the value is to 1, the more the output will change or increase. Likewise, there can be negative weights. Negative weights proportionately reduce the value of the output. For instance, the more the value of the input increases, the more the value of the output decreases. Negative weights may contribute to negative scores, which are described in more detail below. In many instances, only a selected set of features are primarily responsible for a determination of whether a particular predetermined image style belongs to a certain label.

In another illustrative example of the training component 103, some embodiments learn an embedding (e.g., a procedural style embedding) of feature vectors based on deep learning to detect similar predetermined image styles in feature space using distance measures, such as cosine distance. In these embodiments, each of the labeled predetermined image style is converted from string or other form into a vector (e.g., a set of real numbers) where each value or set of values represents the individual features of the predetermined in feature space. Feature space (or vector space) is a collection of feature vectors that are each oriented or embedded in space based on an aggregate similarity of features of the feature vector. Over various training stages or epochs, certain feature characteristics for each labeled predetermined image style can be learned or weighted. For example, for a first predetermined image style family (e.g., a certain category or type of an image style), the most prominent feature may be a pattern of smoke in the background, whereas other features change considerably or are not present, such as the actual color of the pattern of smoke. Consequently, patterns of smoke can be weighted (e.g., a node connection is strengthened to a value close to 1), which is indicative of the label taking on this feature. In this way, embodiments learn weights corresponding to different features such that important features found in similar predetermined image styles and from the same family or classification contribute positively to the similarity score and features that can change even for the same classification contribute negatively to the similarity score. In some embodiments, the "embeddings" described herein represent a "procedural style embedding," which include an embedding of predetermined image styles that are generated procedural effects, which are each indicative of a procedural texture created using an algorithm (e.g., fractal noise and turbulence functions) as described herein, such as PHOTOSHOP actions.

The image style extracting component 105, extracts one or more features corresponding to image style from the one or more target images 115. This is contrasted to certain technologies that extract the content or payload of target images. For example, the image style extracting component 105 can extract the line patterns, shading, background effects, color, and the like of the content itself (e.g., without extracting the lines and features that make up the payload, such as an object representing a portrait picture of someone). The extracting of these one or more features can be performed in any suitable manner. For example, some embodiments capture the image resolution values (e.g., by locating a metadata field indicating the resolution values) of each portion of a target image and apply the specific resolution values to the target image. For example, some images have a clear resolution of a foreground object but a hazy or lower resolution of the background. Accordingly, embodiments can capture these resolution values and apply them to a target image. Alternatively or additionally, other values can be captured in metadata fields of the target image(s) 115, such as any Exchangeable Image File Format (EXIF) data (e.g., shutter speed, focal length, etc.) to extract features corresponding to image style transfer.

Alternatively or additionally, the image style extracting component 105 uses Convolutional Neural Networks (CNN) and feature space designed to capture texture information. This feature space can be built on top of filter responses (e.g., filtered images in a CNN) in any layer of a neural network. The feature space may indicate correlations between the different filter responses, where the expectation is taken over the spatial extent of the feature maps. In some embodiments, these feature correlations are given by the Gram matrix $G^l \in R^{N_l \times N_l}$ where $G_{ij}^l$ is the inner product between the vectorised feature maps i and j in layer l:

$$G_{ij}^l = \sum_k F_{ik}^l F_{jk}^l.$$

By including the feature correlations of multiple layers, a stationary, multi-scale representation of the input image can be received, which captures its texture information (e.g., the style of the lines that make up a facial object) but not the global arrangement or objects or content of the image (e.g., the facial object itself). Accordingly, particular embodiments construct an image that matches the style representation of a given target image. In various embodiments, this is done by using gradient descent from a white noise image to minimize the mean-squared distance between the entries of the Gram matrices from the original image and the Gram matrices of the image to be generated.

In various embodiments, i and X can represent the target image and the image that is generated, and $A^l$ and $G^l$ their respective style representation in layer l. The contribution of layer l to the total loss is then $$E_l = \frac{1}{4N_l^2 M_l^2} \sum_{i,j} (G_{ij}^l - A_{ij}^l)^2$$

and the total style loss is $$\mathcal{L}_{style}(\vec{a}, \vec{x}) = \sum_{l=0}^{L} \omega_l E_l,$$

where $\omega_l$ are weighting factors of the contribution of each layer to the total loss (see below for specific values of $\omega_l$ in our results). The derivative of $E_l$ with respect to the activations in layer may be computed analytically:

$$\frac{\partial E_l}{\partial F_{ij}^l} = \begin{cases} \frac{1}{N_l^2 M_l^2} ((F^l)^T (G^l - A^l))_{ji} & \text{if } F_{ij}^l > 0 \\ 0 & \text{if } F_{ij}^l > 0. \end{cases}$$

The gradients of $E_l$ with respect to the pixel values $\vec{x}$ can be readily computed using error back-propagation.

The image style classification component 111 is generally responsible for classifying or making predictions associated with the target image(s) 115, such as predicting that one or more selected portions of the selected target image belongs to a certain class or category of images styles. In various embodiments, the "certain class or category of image styles" corresponds to a labeled image effect (e.g., within the unlabeled/labeled image effects 113. Accordingly, the image style classification component 111 may predict or determine that one of the target images 115 is within a same class or label as one or more predetermined image styles. In some embodiments, the classification component performs its functionality via one or more machine learning models (e.g., Region Convolutional Neural Networks (R-CNN), You-Only-Look-Once (YOLO) models, or Single Shot MultiBox Detector (SSD)). Alternatively, some embodiments do not use machine learning models, but use other functionality (e.g., Jaccard similarity) as described below to classify or make predictions associated with image styles.

The scoring component 107 is generally responsible for generating a similarity score for each predetermined image style, which is indicative of a measure of similarity between the one or more features extracted by the image style extracting component 105 and each predetermined image style. In some embodiments, a deep neural network is used to find the closest match predetermined image style to the one or more features extracted. For example, some embodiments use the same embeddings of features vectors in the same feature space described with respect to the training component 103. Accordingly, for example, a Euclidian distance is determined between a feature vector that represents the one or more features and each feature vector that represents a given predetermined image style that has already been embedded in the feature space via the training component 103. Therefore, some embodiments generate a score directly proportional to the distance determined between these feature vectors. For example, a feature vector representing a first predetermined image style may be closest to the feature vector representing the one or more extracted features relative to other feature vectors representing other predetermined image styles. Accordingly, particular embodiments would score the first predetermined image style the highest, followed by lower scores directly proportional to the distance between feature vectors.

Alternatively, in some embodiments, the scoring component 107 need not use feature space embeddings or machine learning models in general for generating a similarity score. Some embodiments, for example, use Jaccard similarity for overlapping image style features, cosine similarity, Pearson's correlation, Spearman's correlation, Kendall's Tau, and/or the like to score different predetermined image styles relative to their similarity to image style features of the target image.

The ranking component 109 is generally responsible for ranking each predetermined image style based on the generating of the similarity score by the scoring component 107. For example, using the illustration above, in response to the scoring component 107 scoring the first predetermined image style the highest, followed by lower scores directly proportional to the distance between feature vectors, the ranking component 109 makes rankings directly proportional or corresponding to the scores, such as ranking the first predetermined image style the highest.

The image style determiner 110 makes a prediction or classification based at least in part on the ranking by the ranking component 109 and/or the scoring component 107. These target classifications may either be hard (e.g., membership of a class is a binary "yes" or "no") or soft (e.g., there is a probability or likelihood attached to the classification with a certain confidence level). Alternatively or additionally, transfer learning may occur. Transfer learning is the concept of re-utilizing a pre-trained model for a new related problem. For example, confidence levels obtained to detect whether the target image is a first image style can be used to detect non-first image styles. A new dataset is typically similar to original data set used for pre-training. Accordingly, the same weights can be used for extracting the features from the new dataset. In an illustrative example, an original data set within the labeled image effects 113 may include a labeled predetermined image style, "water color." It may also be case in training that 95% of the time, any time an image style was labeled "water color," it had a certain fading effect feature. Accordingly, via transfer learning and for a new incoming data set, the target image may not include this certain fading effect feature. Using the same weights, it can be inferred that this target image is not a "water color" image style.

In an illustrative example of the "hard" classification, the image style determiner 110 may determine that a target image (or the extracted image style features of the target image) is a "water color" image style based on this being the highest ranked image style. In an illustrative example of the "soft" classification, the image style determiner 110 may determine that the target image is 90% likely to be a "water color" image style based on the ranking and specific scoring values.

The presentation component 120 is generally responsible for presenting content (or causing presentation of content) and related information to a user, such as indications (e.g., identifiers identifying) of one or more of the ranked predetermined image styles. Presentation component 120 may comprise one or more applications or services on a user device, across multiple user devices, or in the cloud. For example, in one embodiment, presentation component 120 manages the presentation of content to a user across multiple user devices associated with that user. Based on content logic, device features, and/or other user data, presentation component 120 may determine on which user device(s) content is presented, as well as the context of the presentation, such as how (or in what format and how much content, which can be dependent on the user device or context) it is presented, when it is presented. In particular, in some embodiments, presentation component 120 applies content logic to device features, or sensed user data to determine aspects of content presentation.

In some embodiments, presentation component 120 generates user interface features associated with the predetermined images styles. Such features can include interface elements (such as graphics buttons, sliders, menus, audio prompts, alerts, alarms, vibrations, pop-up windows, notification-bar or status-bar items, in-app notifications, or other similar features for interfacing with a user), queries, and prompts. For example, the presentation component 220 can cause presentation of a list of ranked predetermined image styles as determined by the ranking component 109. The presentation component 120 can additionally or alternatively cause presentation of other contextual data or metadata, such as timestamps of when a target image was uploaded, source images, UI elements for users to manipulate source images, and the like.

The image style transfer component 130 is generally responsible for transferring image style from a predetermined image style to one or more of the source images 117. For example, a user may have uploaded a source image to an application. In response to the presentation component 120 presenting each predetermined image style (e.g., in a ranked order), the image style transfer component 130 may receive a user selection of a first predetermined image style and automatically transfer the image style to the source image. The functionality of the image style transfer component 130 may occur in any suitable manner that is not destructive in nature. The layer modification component 140 is generally responsible for parsing each pixel manipulations or layers of each predetermined image style and activating each layers such that they are fully editable or modifiable by users. For example, the layer modification component 140 can break down or parse each layer (e.g., foreground, background, specific texture patterns, etc.) of the predetermined image as an individual pre-recorded process that represents a particular sub-image style or sub-visual effect of an image style. Each pre-recorded process is combined so that the user can incorporate all the sub-mage styles at once (e.g., via a single click) during image transfer, while retaining the ability to modify any one of the pre-recorded processes, such as deleting, adding, or editing a particular layer or process. In this way, the user has full control over the image effect.

Consumer applications 190 generally refers to one or more computer applications or services, such as online/cloud applications or locally stored apps that consume, include, or utilize some or each of the components of the system 100. In particular, a consumer application 190 may receive both a target image 115 and source image 117 in order to apply one or more image styles from the labeled/unlabeled image effects 113 to the source image 117, as described within the system 100. In some embodiments, a consumer application 190 may utilize the presentation component 120 to provide scored predetermined image styles. Examples of consumer applications 290 may include, without limitation, computer applications or services for presenting media and/or editing media (e.g., Adobe® Photoshop®, Adobe After Effects®, and Adobe Premiere®), or other computer applications that include such functionality, such as social media service applications (e.g., PINTEREST, FACEBOOK, etc.), email, messaging, chat, or any other web application, plugin, extension, or locally stored application.

Figure 2:
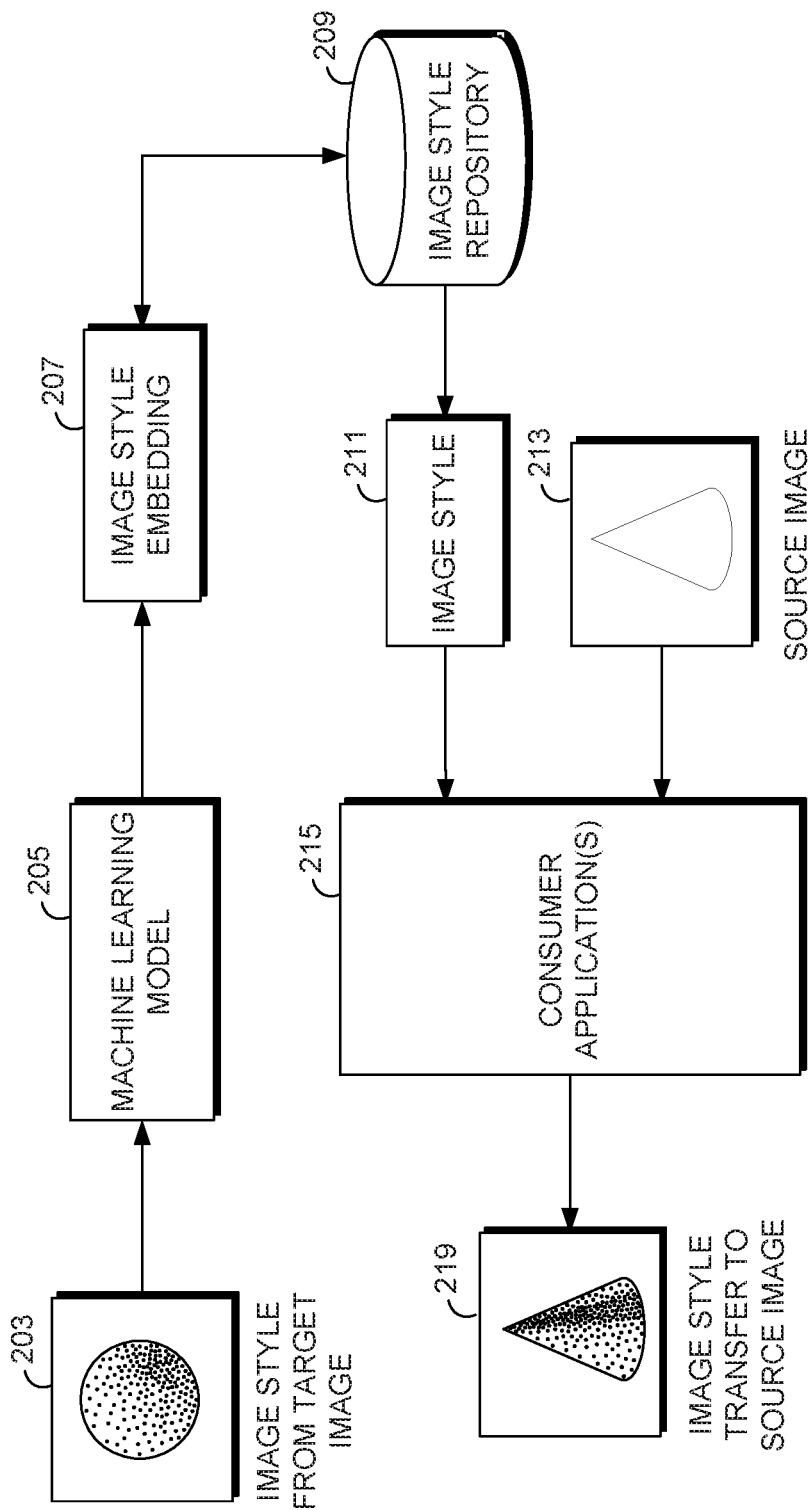
FIG. 2 is a block diagram of a computing system architecture in which aspects of the present disclosure are employed, according to some embodiments.

Referring now to FIG. 2, a block diagram of a system 200, according to some embodiments. FIG. 2 is not intended to be limiting and other arrangements and elements can be used in addition to or instead of those shown in system 200, and some elements may be omitted altogether for the sake of clarity. Further, as with the system 100 of FIG. 1, many of the elements described herein are functional entities that may be implemented as discrete or distributed components or in conjunction with other components, and in any suitable combination and location. The functionality of system 200 may be provided via a software as a service (SAAS) model, e.g., a cloud and/or web-based service. In other embodiments, the functionalities of system 200 may be implemented via a client/server architecture. In some embodiments, there are more or less components than illustrated in the system 200.

The system 200 is generally responsible for transferring a predetermined image style derived from the one or more consumer applications 215 and that is similar to image style from the target image 203. As illustrated in the target image 203, the image style includes a stippling pattern that outlines a sphere. "Stippling" is a style where the generating of objects occurs by using dots, instead of lines or other continuous stroke manipulation. It is understood that this style is representative only and that any suitable image style can be present in a target image, such as hatching, contour hatching, scumbling, cross hatching, water color, oil paint, sketching, fading, etc. In some embodiments the target image 203 represents the target image(s) 115 of FIG. 1.

As illustrated in the system 200, the image style is extracted from the target image 203. For example, the stippling pattern or corresponding pixels are extracted from the target image 203. In some embodiments, this extraction is performed by the image style extracting component 105 of FIG. 1. In an illustrative example of how image style is extracted, a first neural network can be used where each node (also referred to as a "neuron") fires (amplifies) or dampens based on the whether the feature values correspond to content of the target image 203 or image style. For example, each node may combine a specific feature, such as the stippling style pixels, with a set of weights or coefficients that amplify the features, thereby assigning significance to this feature with regard to the task the algorithm is trying to learn. These feature-weight products can then be summed and passed through a node's function (e.g., an activation function) to determine whether and to what extent that signal should progress further through the network to affect the ultimate outcome. In this example of the stippling feature, the signal would pass through and thus the neuron would be activated to a first value. Other neurons corresponding to content features of the image 203 (e.g., features that represent the spherical shape of the image) would be dampened or inhibited (e.g., to a lower value because they are not as indicative of image style).

The system 200 illustrates that the image style (or features representing image style) are run through a machine learning model 205. In some embodiments, the machine learning model 205 represents or includes the image style classification component 111 of FIG. 1. In an illustrative example of the machine learning model 205 functionality, features of the image style are analyzed by a deep embedding neural network (e.g., a second neural network), such as a particular CNN (e.g., a VGG) where each node fires or dampens based on the feature values inputted being indicative of particular classifications or predictions of specific image styles. For example, each node may combine a specific feature, such as the stippling style pixels, with a set of weights or coefficients that amplify the features, thereby assigning significance to this feature with regard to the task the algorithm is trying to learn, such as determining which feature (of the extracted features) is most helpful for classifying the image style. These feature-weight products can then be summed and passed through a node's function (e.g., an activation function) to determine whether and to what extent that signal should progress further through the network to affect the ultimate outcome. In this example of the stippling feature, the signal would pass through and thus the neuron would be activated to a first value. Other features corresponding to other neurons of other image styling, such as the color or shading would may also be activated (e.g., to a lower value because they are not as indicative of a particular "stippling" classification).

In some embodiments, the output of the machine learning model 205 is the style embedding 207, which represents the image style features extracted from the target image 203 as a feature vector in vector space. This same vector space can include feature vectors representing each image effect (or predetermined image style) within the image style repository 209 so that distances between each feature vector can be determined. For example, this can occur in the same way as described with respect to the scoring component 107 of FIG. 1, where the feature vector representing one or more portions of a target image (indicative of image style) is embedded in the same feature space as trained feature vectors representing predefined image styles. In this way embodiments (e.g., the scoring component 107) can determine a distance (e.g., a Euclidian distance) between a feature vector representing the "stippling" image style of the image 203 and each feature vector representing each image effect within the image style repository 209.

In various embodiments one or more image styles 211 (of the image style repository 209) that have corresponding feature vectors within a threshold distance (or similarity score) of the feature vector representing the image style of the target image 203 are rendered or provided to the one or more consumer applications 215. For example, the image effects can be several "PHOTOSHOP actions" that match the "stippling" image style derived from the target image 203. A "PHOTOSHOP action" is a set of pre-recorded processes (e.g., an algorithm of procedural textures) that represents a particular image or visual effect. The pre-recorded processes are combined so that the user can incorporate all the image effects at once, while retaining the ability to modify any one of the pre-recorded processes. In some embodiments, the one or more consumer applications 215 represent the consumer application(s) 190 of FIG. 1. For example, the consumer application can be a PHOTOSHOP application As illustrated in the system 200, the source image 213 is also uploaded to the one or more consumer applications 215. As illustrated, the source image 213 includes a triangle shape that is defined by dark lines. However, in response to receiving a user request to apply the image style 211 (which, for example, most closely resembles the image style of the target image 203) to the source image 213, the output is the style transfer image 219, which includes the payload or content of the source image 213 (i.e., a triangle), with an image style that more closely resembles the image style from the target image 203 (but does not include the payload or content—the sphere—similar to the target image 203).

Figure 3A:
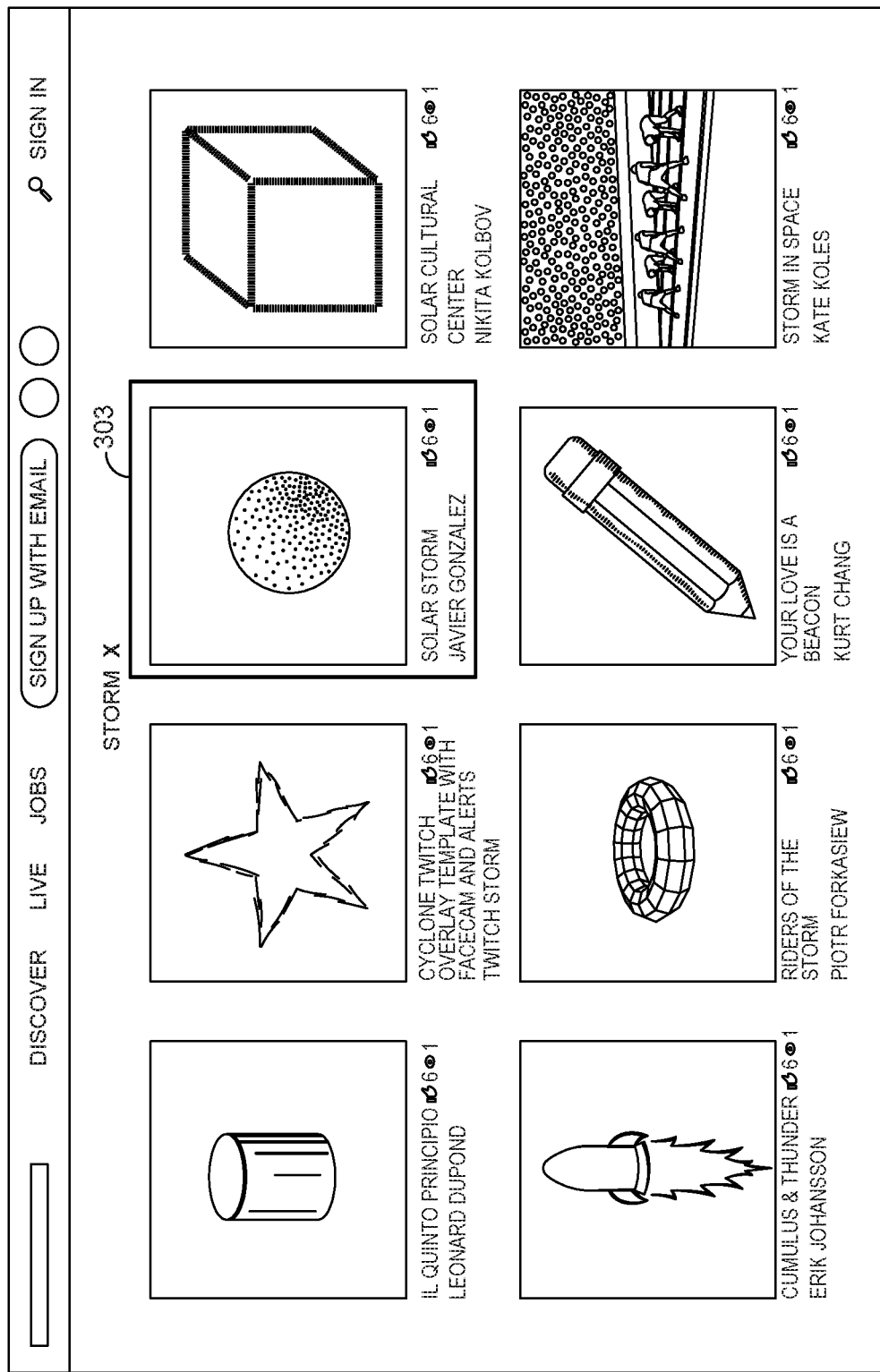
FIG. 3A is an example screenshot of an application page that lists different target image candidates, according to some embodiments.

FIG. 3A is an example screenshot 300 of an application page that lists different target image candidates, according to some embodiments. A user may be on a creative website like Behance and finds inspiration for her artwork. However, she may have very little idea how to achieve the same "solar storm" image effect inside a consumer application. In various embodiments, the screenshots 300, 300-1, 300-2, 300-3 of FIGS. 3A, 3B, 3C, and 3D is generated by the presentation component 120 of FIG. 1. The user may be interested in applying a "solar storm" type effect. Accordingly, the user may input a URL at a client application (e.g., a web browser) and/or input search engine string(s) and input the word "storm." Responsively, the client application may cause display of the screenshot 300. After the user browses the various images, the user may select the target image 303, as inspiration to apply the "solar storm" image style to a source image. Subsequently, some embodiments (e.g., the consumer application(s) 105) receive the target image 303 in response to a user-initiated upload of the target image 303 from the screenshot 300 or (local download on a user device).

Figure 3B:
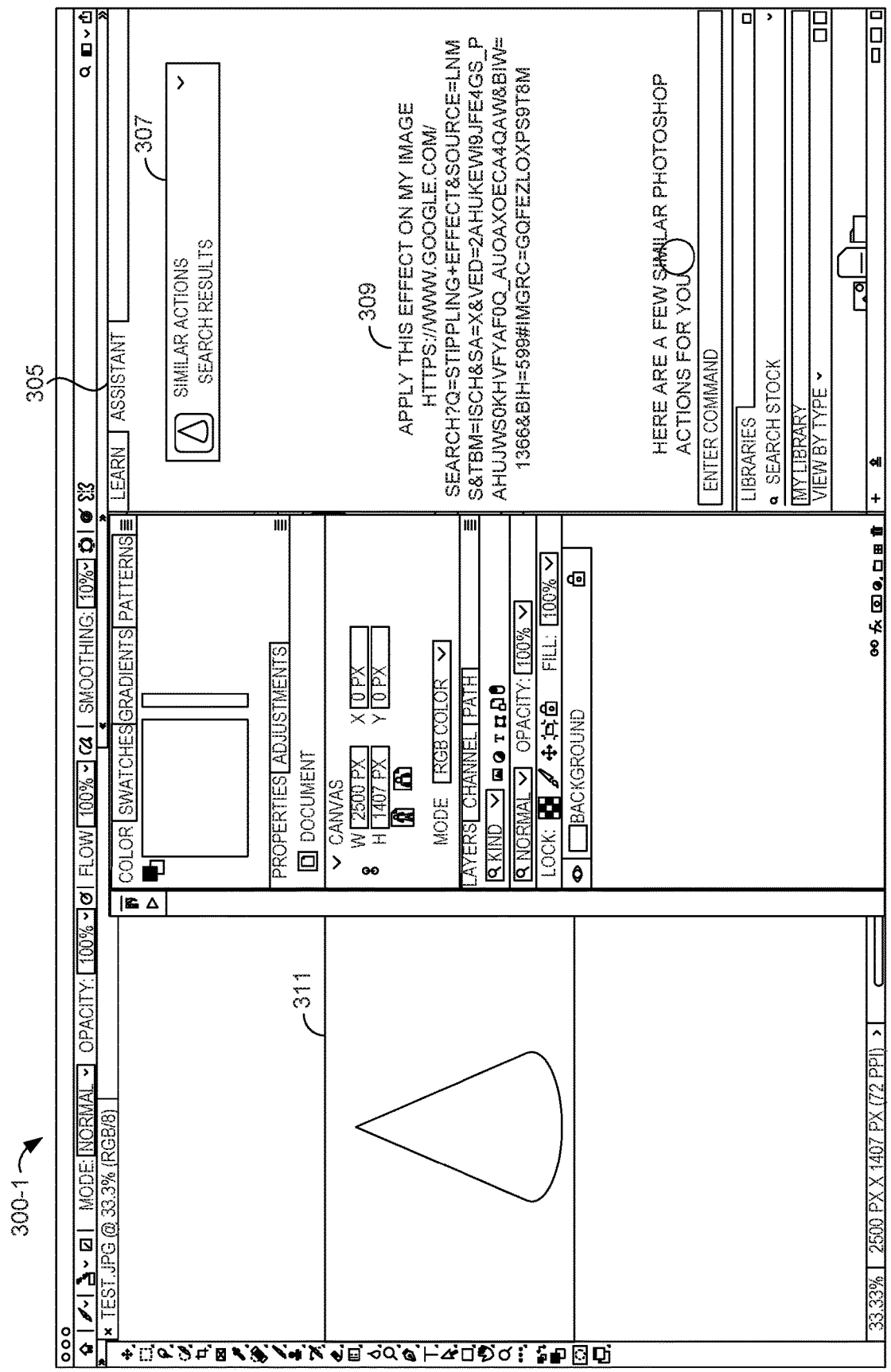
FIG. 3B is an example screenshot of the consumer application of FIG. 3A illustrating assistant functionality that is configured to provide a list of predetermined image styles similar to the image style of the target image of FIG. 3A as candidates to apply to a source image, according to some embodiments.

FIG. 3B is an example screenshot 300-1 of a consumer application of FIG. 3A illustrating assistant functionality that is configured to provide a list of predetermined image styles similar to the image style of the target image 303 of FIG. 3A as candidates to apply to the source image 311, according to some embodiments. The use may ask the assistant (e.g., "PHOTOSHOP Assistant") to identify and apply the predetermined image effect "solar storm" of the selected artwork inspiration. In some embodiments, the consumer application (e.g., the consumer application 190) receives a user upload of the source image 311 and receives a user request indicative for an assistant functionality corresponding to UI element 315 to identify and apply the image style of the target image 303 to the source image 311. In response to receiving this request, the consumer application extracts features indicative of image style of the target image 300 and classifies or determines which predetermined image style is most similar (within a threshold) to the image style of the target image 303. For example, in response to receiving this request, the image style extracting component 105 extracts image style features and the image style classification component 111 determines which predetermined image style has a similarity score above a threshold.

The consumer application includes a UI element 309 that allows the user to upload, input a URL to, or otherwise request image styles similar to the "solar storm" image style of the target image 303. The consumer application also includes a selectable UI element 307 (e.g., a drop down arrow) so that the user can view each predetermined image styles that are "similar actions" relative to the image style (i.e., the "solar storm" style) of the target image 303 in response to the user request associated with the UI element 309. Accordingly, for example, responsive to receiving the user request, the image style classification component 111 performs its functionality and the presentation component 111 can cause display of the predetermined image styles.

Figure 3C:
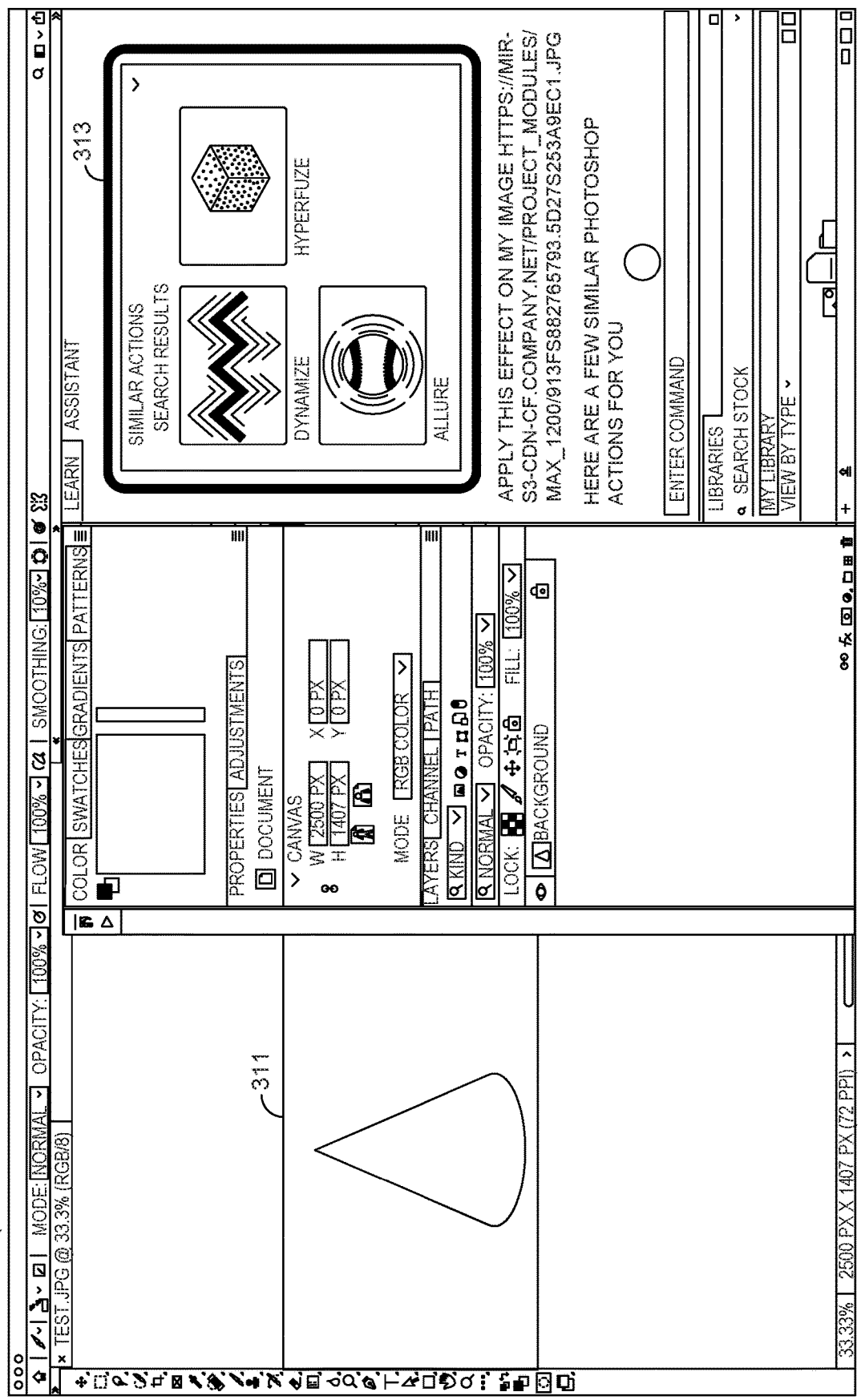
FIG. 3C illustrates an identity of the predetermined image styles of FIG. 3B, according to some embodiments.

Responsive to receiving a user selection of the UI element 307, embodiments present or display the list of these predetermined image styles. The assistant functionality gives some indications of predetermined image effects suggestions ("hyperfize," "dynamize", and "allure") that can be applied to the user's image—the source image 311. The screenshot 300-2 of FIG. 3C, illustrates that the predetermined image styles are "dynamize," "hyperfuse, and "allure." Each of these predetermined image styles are candidates to apply to the source image 311 depending on which predetermined image style(s) the user selects.

Figure 3D:
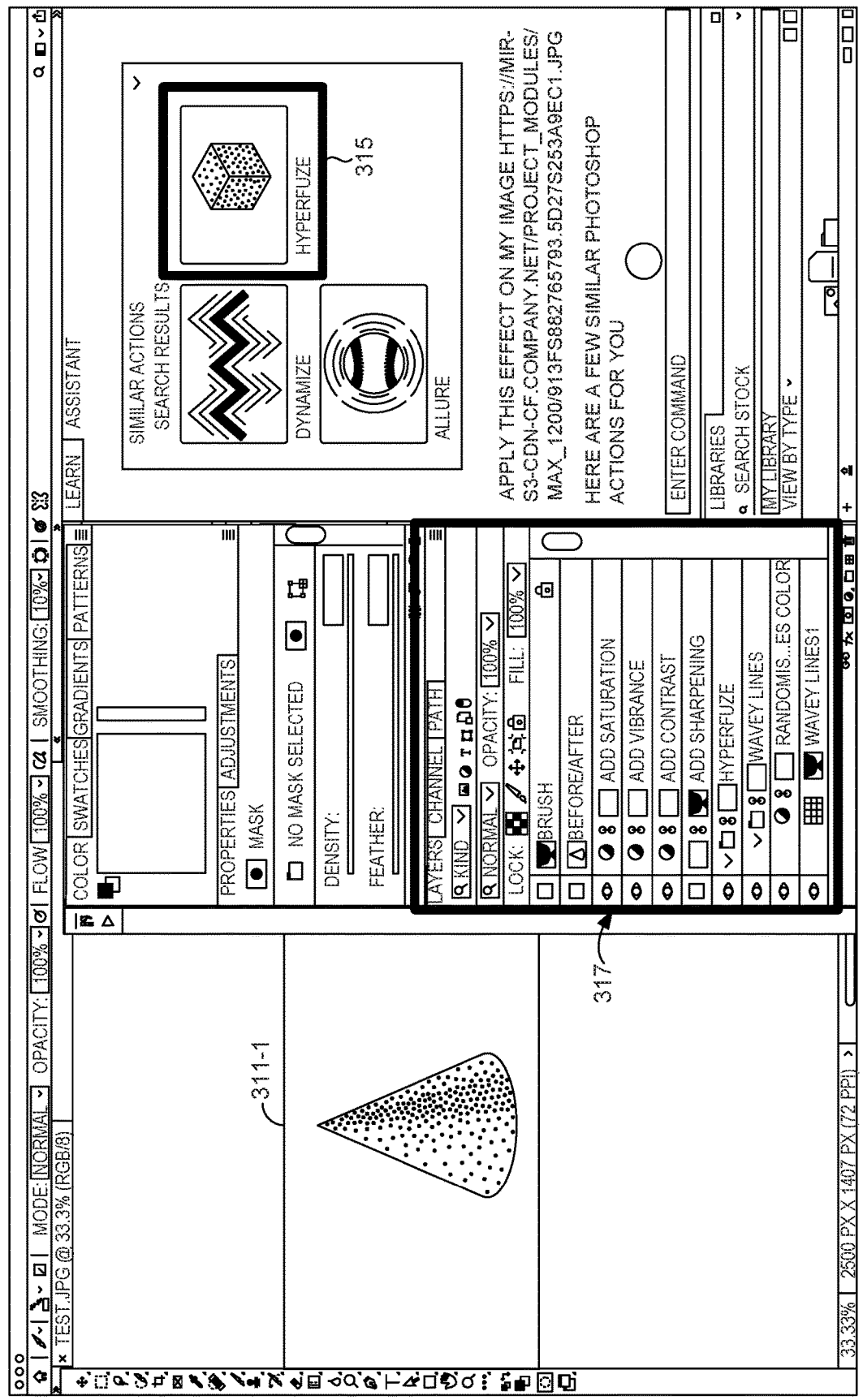
FIG. 3D is an example screenshot of the consumer application of FIG. 3A illustrating a selected predetermined image style that has been applied to a source image and a user modifying the source image, according to some embodiments.

FIG. 3D is an example screenshot 300-3 illustrating a selected predetermined image style that has been applied to the source image 311 and a user modifying the source image 311-1, according to some embodiments. The user selects a predetermined image style from the suggested candidates and the assistant functionality applies the image effect on the user's source image 311. Specifically, particular embodiments receive the user selection of the "hyperfuze" predetermined image style indication 315 and responsively and automatically apply (or superimpose) the "hyperfuze" image style to or over the source image 311 to arrive at a final source image 311-1. In some embodiments, this applying of the "hyperfuse" image style is performed by the image style transfer component 130 of FIG. 1. The UI element 317 indicates the different layers created to achieve the "hyperfuze" image effect. As illustrated herein, some image styles are inherently multi-layered in that they include a set of pre-recorded processes (i.e., sub-image effects) or steps that when aggregated or combined makeup a particular image or visual effect. In an illustrative example, an image style can include a "cross-hatching" sub-image style (a first layer) in the background and a "stippling" sub-image style (a second layer) in the foreground. The user can modify any of these layers in any way desired (e.g., cut, past, add brushes to), such as removing the "stippling" sub-image style (but keeping the "cross hatching" sub-image style) (e.g., via the layer modification component 140). These pre-recorded processes (layers) are combined so that the user can aggregate all the sub-image styles at once (e.g., in response to a single click of the "hyperfuze" indication 315) into the sub image style, while retaining the ability to modify any one of the pre-recorded processes or layers. This is different than existing image transfer technologies, for example, that destructively modify image pixels without the user having the ability to modify layers, as described herein.

As described herein, instead of applying the image style using a deep network, particular embodiments identify the image style of the target image using a deep embedding neural network and suggest different predetermined image style that can produce similar style embeddings. Thus, the desired image effect or style is obtained using various consumer application features, such as brushes, layers, adjustments, edge enhancement, compositions, and the like as illustrated by all the functionality in the UI element 317.

Figure 4:
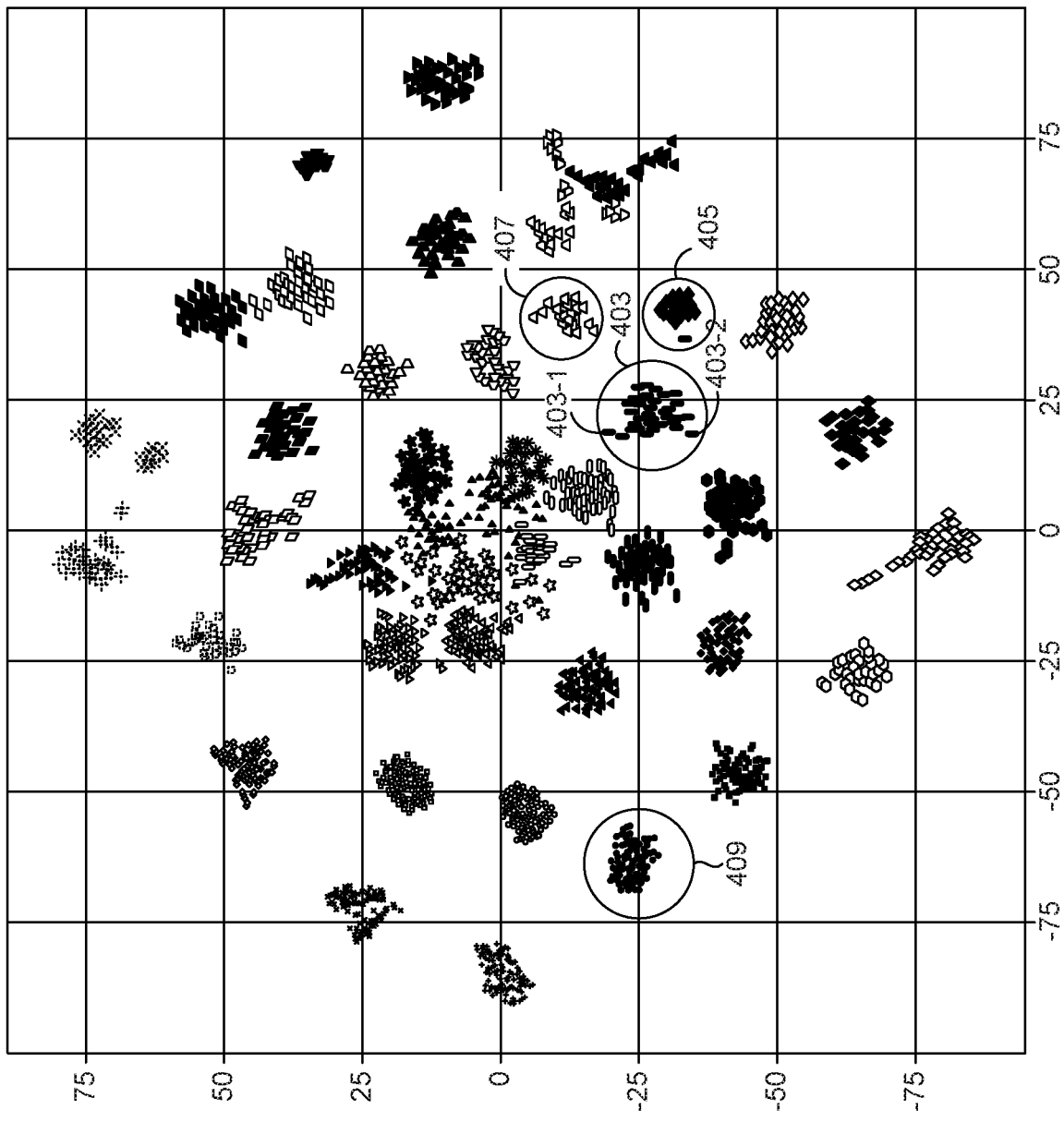
FIG. 4 is a schematic diagram of an example visualization of an image style feature space that includes various image style feature vectors, according to some embodiments.

FIG. 4 is a schematic diagram of an example visualization of an image style feature space 400 that includes various image style feature vectors, according to some embodiments. In some embodiments, the image style feature space 400 represents the style embedding 207 and vice versa. In some embodiments, the image style feature space represents any feature space described herein, such as described with respect to the training component 103 and the scoring component 107.

As illustrated in FIG. 4, the image style feature space 400 includes clusters of data points (e.g., data point 403-1 and data point 403-2) representing individual feature vectors corresponding to image style feature(s) of training image or test images (e.g., a target image). These data points are clustered together to form a predetermined image style class (referred to herein as "predetermined image style" or "predetermined image effect"). For example, the data point 403-1 and data point 403-2 have been classified as a "hyperfuze" predetermined image style 403 (e.g., the same hyperfuze predetermined image style represented in the indication 315 of FIG. 3D.). There are other classes of predetermined image styles, such as the "dynamize" predetermined image style 405 and the "allure" predetermined image style 407 (e.g., the same indications of image styles as represented in FIG. 3D)

In an illustrative example of how the image style feature space 400 is used, embodiments first receive a target image (e.g., the target image 303 of FIG. 3A). Then some embodiments run the target image through a machine learning model (e.g., the machine learning model 205) in order to learn and weight image style features for the target features, after which an image style feature vector (e.g., representing the data point 403-1) is embedded in the image style feature space 400. The feature space 400 acts as a multidimensional coordinate system where each feature is associated with a dimension. Each feature value within the feature vector may be summed or otherwise aggregated to arrive at a final coordinate point within the image style feature space 400. Each of the data points within the predetermined image style class 403, for example, are within a feature similarity threshold and so they are close to each other in the image style feature space 400. Responsive to the embedding of the feature vector in the image style feature space 400, embodiments classify the image style of the target image or determine what predetermined image style the image style of the target image is closest to. For example, if the image style of the target image represents data point 403-1, then the cluster or classification that is nearest to the data point 403-1 is the "hyperfuze" predetermined image style 403. Accordingly, for example indications of the "hyperfuze" predetermined image style 403, as well as those classifications or predetermined image styles closest to the "hyperfuze" style 403—the "dynamize" style 405 and "allure" style 407—are returned to a user, as illustrated in FIG. 3D.

In some embodiments, the machine learning model used for the image style feature space 400 is an inception v3 CNN model where the first thirteen layers are used. In some embodiments, the output of the second last layer of the mode is a style embedding representing the image style feature space 400, the classes of which can be visualized using their 2D t-SNE projections. The 2D projections of the style embeddings of test/training images are clustered according to their predetermined image style class and are well separated. Further, the predetermined image styles that are similar in appearance are closer in feature space. For example, clusters of "oil painting", "watercolor," and "impressionalist" are closer, clusters of "allure" 407, "dynamize" 405, and "hyperfuze" 403 are closer, "Vintage" and "Antiqu Guilloche" are closer, etc.

The machine learning model is able to cluster samples of new unseen predetermined image styles (or new unseen target image styles) in the image style feature space 400. In some embodiments, every predetermined image style is represented by the median of its samples' embeddings as shown below:

$$C_j = \text{median}\{f_{embed}(S_i^j): I=1,2,\ldots,n]$$

Where $f_{embed}$ is the output of the model, $S_i^j$ is the $i^{th}$ sample of the $k^{th}$ predetermined action class. The prediction for any test sample X is given by:

$$Pred(X) = \arg\min_j \|C_j - f_{embed}(X)\|.$$

However, it is understood that median is just one way to represent the style embedding of the predetermined image style. Some embodiments alternatively use other statistics like mean, pth percentile, etc.

Figure 5:
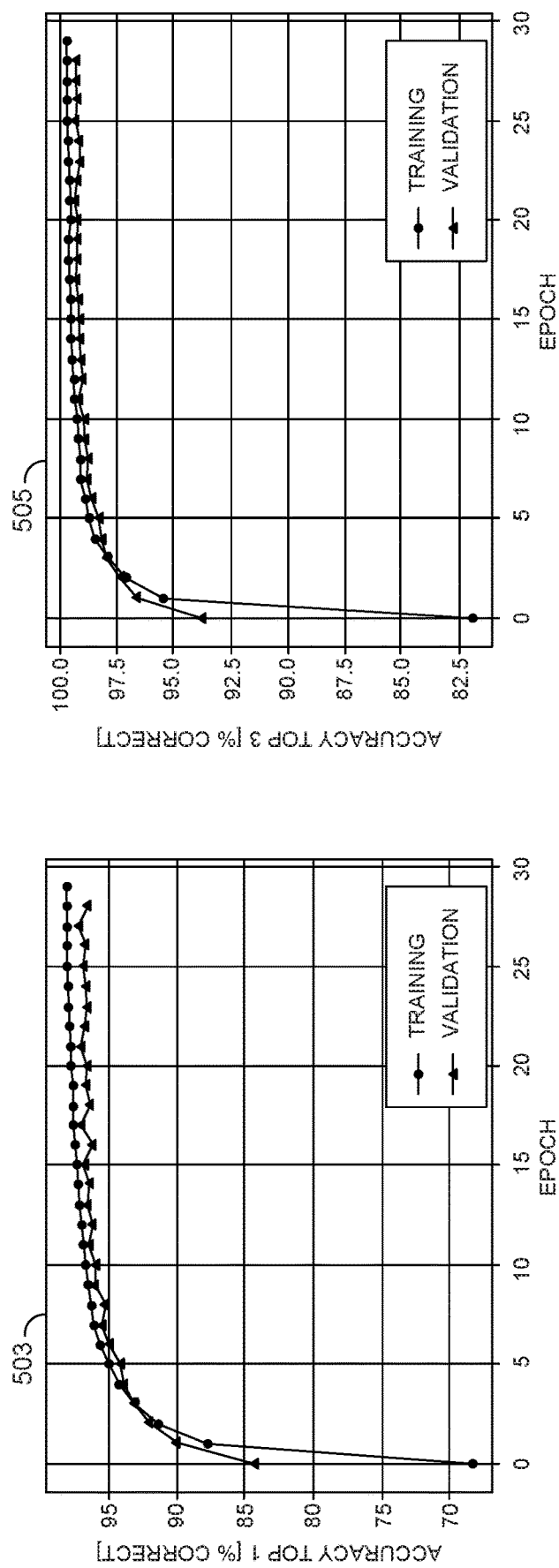
FIG. 5 illustrates experimental results of the training and validation accuracy for the top 1 and top 3 PHOTOSHOP action predictions, according to some embodiments.

FIG. 5 illustrates experimental results of the training and validation accuracy for the top 1 and top 3 PHOTOSHOP action predictions, according to some embodiments. In some experimental embodiments, 40 different PHOTOSHOP action (a type of predetermined image style) were used (although this number can be any number) to generate a data set of about 3500 image samples per Photoshop Action. Some experimental embodiments include a machine learning model (e.g., the machine learning model 205) that use the first thirteen layers (Mixed_6e) of pre-trained "inception-v3 CNN" model" to extract features from the given input image or target image. It is noted that certain embodiments also combine the outputs of other layers of a pre-trained model (instead of using the output of the 13th layer). Since the first thirteen layers are fully convolutional, the output has the dimension of 720*w*h. Particular embodiments take the mean of this output along w and h to obtain a feature vector of dimension 720. In particular embodiments, this feature vector is then fed to a fully connected neural network with two layers of size 100 and 40 neurons. A full schematic of the model is illustrated in FIG. 6A, FIG. 6B, and FIG. 6C. Various embodiment train the model by keeping weights of inception v3 model fixed using the cross-entropy loss over 40 Photoshop actions.

Using the architecture described above with respect to the inception v3 CNN model and the components described herein (e.g., the training component 103, the image style extracting component 105, the image style classification component 111, and the image style transfer component 130), FIG. 5 illustrates training fully connected layers for around 30 epochs or rounds with a batch size of 20. The training and loss curves are shown in FIG. 6A, FIG. 6B, and FIG. 6C. As illustrated, the model (e.g., the machine learning model 205) can learn and generalize well on the task of identifying different Photoshop styles with a top-1 accuracy of around 96.56%, as illustrated in the table 503 and a top-3 class prediction accuracy of around 99.32%, as illustrated in the table 505. Accordingly, embodiments also improve on prediction accuracy.

Exemplary Flow Diagrams

Figure 7:
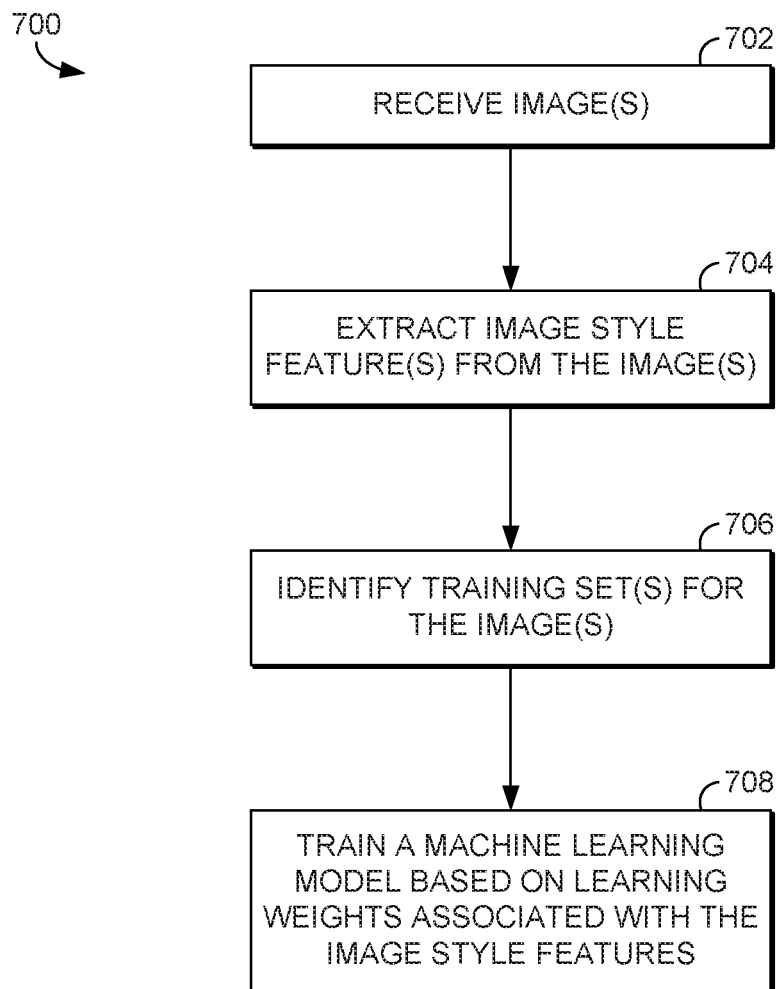
FIG. 7 is a flow diagram of an example process for training a machine learning model, according to some embodiments.

FIG. 7 is a flow diagram of an example process 700 for training a machine learning model, according to some embodiments. The process 700 (and/or any of the functionality described herein) may be performed by processing logic that comprises hardware (e.g., circuitry, dedicated logic, programmable logic, microcode, etc.), software (e.g., instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer)

blocks may exist than illustrated. Added blocks may include blocks that embody any functionality described herein (e.g., as described with respect to FIG. 1 through FIG. 10). The computer-implemented method, the system (that includes at least one computing device having at least one processor and at least one computer readable storage medium), and/or the computer readable medium as described herein may perform or be caused to perform the process 700 or any other functionality described herein. In some embodiments, the process 700 is performed by the training component 103.

Per block 702, one or more images (e.g., a plurality of photographs) are received. In some embodiments, the one or more images have been labelled or classified according to a predetermined image style prior to training. For example, some embodiments are supervised and may receive a user input label of "hyperfuze," indicative of an image having an image style of hyperfuze. Alternatively, in some embodiments the one or more images are not labeled or have no classification prior to training, such as in some unsupervised machine learning contexts. In some embodiments, the one or more images of block 702 represents any target image described herein.

Per block 704, particular embodiments extract one or more image style features from each of the one or more images. For example, some embodiments extract pixel features that represent an "oil painting" pattern, a "stippling" pattern, and a "watercolor" pattern from an image, the contents of which represent a portrait of a person. In some embodiments, block 704 is performed by the image style extracting component 105 of FIG. 1 and therefore block 704 includes some or all of the functionality described therein.

Per block 706, one or more training sets are identified for the image(s). For example, in a supervised context where images are labelled, images with the same label are identified in preparation for training. In an illustrative example, pairs of images that have the same label can be paired, as well as pairs of images that have differing labels can be paired. In unsupervised context where images are not labeled, any image can be paired with any other arbitrary or randomly selected other image.

Per block 708, a machine learning model (e.g., a deep learning model) is trained based at least in part on learning weights associated with the extracted image style features. For example, using the illustration above, a particular "hyperfuse" image style may be associated with or contain sub-image styles or layers of a first lighting type and a first color. These weights can be learned for each image to determine which are the most important for being classified as "hyperfuze."

In some embodiments, pairs of same labeled images and dissimilar labelled images (or any set of non-labelled image(s)) are processed or run through a deep learning model by comparing the associated features and mapping it in feature space. And based at least in part on the processing, weights associated with the deep learning model can be adjusted to indicate the importance of the extracted featured for prediction or classification. In some embodiments, the adjusting includes changing an embedding in feature space of a feature vector representing the image style. For example, after a first round or set of rounds of training, it may be unknown which of the extracted features are important for taking on a certain classification or prediction. Accordingly, each feature may take on equal weight (or close to equal weight within a threshold, such as a 2% changed weight) such that all of the image style feature vectors are substantially close or within a distance threshold in feature space. However, after several rounds of training or any threshold quantity of training, these same image style feature vectors may adjust or change distances from each other based on the feature value similarity. The more features of two image style feature vectors that match or are within a threshold value, the closer the two feature vectors are to each other, whereas when image style features do not match or are not within a threshold value, the further away the two feature vectors are from each other. Accordingly, for example, a trained embedding may look similar to the clusters of predetermined image styles represented in the image style feature space 400 of FIG. 4.

In various embodiments, based at least in part on identifying a label for pairs of the images for training, a deep learning model is trained. The training may include adjusting weights associated with the deep learning model to indicate the importance of certain features of the set of images for prediction or classification. In some embodiments, the training includes learning an embedding (e.g., a precise coordinate or position) of one or more feature vectors representing the one or more features representing image style in feature space. Learning an embedding may include learning the distance between two or more feature vectors representing two or more image style features of two or more images based on feature similarity of values between the two or more images and adjusting weights of the deep learning model. For example, as described above, the more that image style features of two images are matching or are within a threshold feature vector value, the closer the two images (e.g., data points 403-1 and 403-2) are to each other in feature space, whereas when features do not match or are not within a feature vector value threshold, the further away the two feature vectors are from each other in feature space. Accordingly, in response to various training stages, the strength of connection between nodes or neurons of different layers can be weighted higher or strengthened based on the corresponding learned feature values that are most prominent or important for a particular family or classification of a predetermined image style. In this way, for example, an entire feature space may include an embedding of vectors or other indications that are all learned or embedded in feature spaced based on learning weights corresponding to different image style features such that indications of images with important image style features within a threshold distance of each other in feature space are near each other, whereas indications corresponding to dissimilar image styles with features that are not important are not within a threshold distance of each other in the same feature space, are further away.

Figure 8:
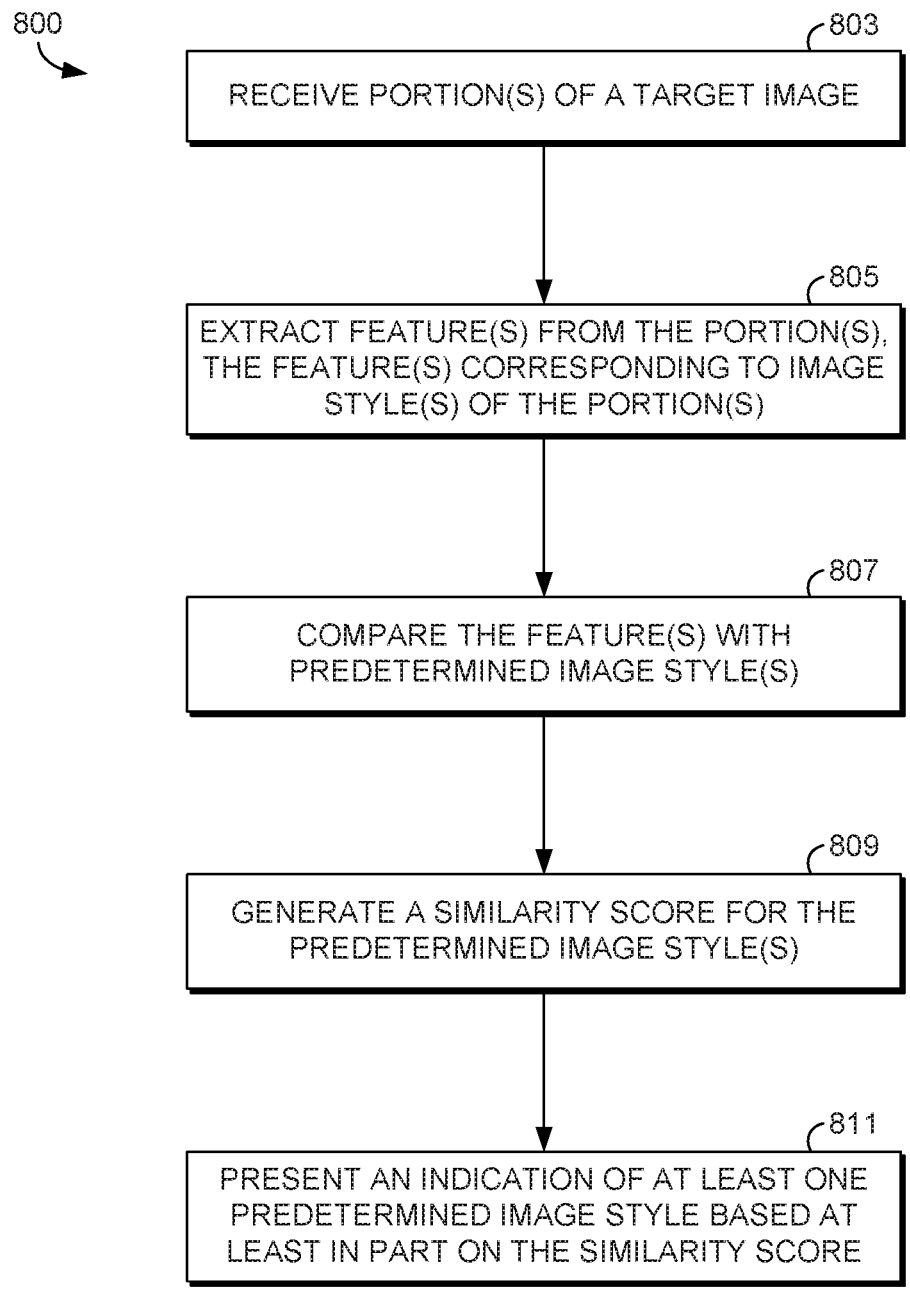
FIG. 8 is a flow diagram of an example process for presenting one or more predetermined image styles based on generating one or more similarity scores, according to some embodiments.

FIG. 8 is a flow diagram of an example process 800 for presenting one or more predetermined image styles based on generating one or more similarity scores, according to some embodiments. In some embodiments, the process 800 represents deployed model or runtime processes where a machine learning model has already been trained. For example, in some embodiments, the process 700 of FIG. 7 may have already occurred such that a machine learning model is trained. For example, prior to the receiving of the one or more portions of the target image per block 803, some embodiments receive a label for each image of a plurality of images, where each label indicates the one or more predetermined image styles (described in block 807). Responsive to this receiving, blocks 704, 707, and 708 occur in particular embodiments. In other embodiments, however, process 800 represents the testing phase or training itself as opposed to runtime or deployed environments.

Per block 803, one or more portions of a target image are received. For example, referring back to FIG. 3A and FIG.

3B, the consumer application can receive the target image 303. In another example, embodiments can receive the target image 203. In some embodiments, the receiving of the one or more portions of the target image occurs in response to a user request to locate a predetermined image style that is similar to an image style of the one or more portions of the target image. This is illustrated, for example, with respect to FIGS. 3A and 3B, where embodiments can receive a user request, selection, or download of the target image 303 so that embodiments can locate one or more image styles similar to the "solar storm" image style of the target image 303. In some embodiments, the one or more portions of the target image is a sub-portion of the target image selected by the user. For example, instead of receiving an indication or upload indicative of the user uploading or otherwise selecting the entire target image, embodiments can receive an indication that the user has selected a top portion of the target image (and not a bottom portion) based on a lasso user input to circle the top portion, gesture, or other indication. Alternatively, in some embodiments the one or more portions of the target image is an entirety of the target image selected by the user (e.g., the user has downloaded an entire digital photograph).

Per block 805, particular embodiments extract one or more features from the one or more portions, where the one or more features correspond to the one or more image styles of the portion(s). For example, in some embodiments, block 805 is performed by functionality as described with respect to the image style extracting component 105 of FIG. 1. As described herein, in many cases the one or more features do not correspond to content of the target image but the image style. For example, referring back to FIG. 2, the features extracted from the target image 203, is the stippling patterns, and not pixels indicating the spherical shape itself. It is understood, however, that there is often crossover on what is considered image style versus content so this is not always the case. In some embodiments an "image style extracting means" (e.g., the image style extracting component 105) extracts the one or more image style features of the target image.

Per block 807, particular embodiments compare the one or more features with the one or more predetermined image styles. For example, some embodiments determine a distance between a first one or more indications (e.g., feature vectors, hashes, classes, or other representations) representing the one or more predetermined image effects and a second one or more indications representing the one or more extracted features. In some embodiments, the determining of the distance includes using a deep neural network (e.g., the machine learning model 205 of FIG. 2) such that the first one or more indications of the one or more predetermined image effects represent a first set of feature vectors (e.g., or an aggregation of the first set of feature vectors, such as a class of predetermined image styles) oriented in feature space and the second one or more indications of the one or more features represent a second feature vector oriented in the feature space, wherein the determining of the distance includes determining a Euclidean distance between each of the first set of feature vectors (or the class of one or more predetermined image styles) and the second feature vector. For example, referring back to FIG. 4, the data point 403-1 may represent a feature vector that corresponds to image style of the one or more portions. A distance can be determined between this data point (or the class 403 that it belongs to) and a centroid (or any measure) of the other predetermined image styles 407 and 405 (e.g., via Ward's method, hierarchical clustering, single-link clustering, complete-link clustering, etc.). Alternatively or additionally, a distance can be determined between this data point and other individual feature vectors, such as the data point 403-2 or any other feature vectors within the predetermined image style classes 405 and 407. In some embodiments, block 807 is performed by some or all of the functionality as described with respect to the scoring component 107 of FIG. 1.

Per block 809, a similarity score is generated for the one or more predetermined image styles. For example, based on the comparing in block 807, embodiments generate a similarity score for each predetermined image style of the plurality of image styles, where the similarity score is indicative of a measure of similarity between the one or more features and each predetermined image style of the plurality of image styles. For example, referring back to FIG. 4, in response to determining that the predetermined image styles 403, 405, and 407 are closer to the data point 403-1 than the predetermined image style 409, embodiments score the predetermined image styles 403, 405, and 407 higher than image style 409. In this way, the generating of the similarity score is based at least in part on the determining of the distance. In some embodiments, the distance is directly proportional to the similarity score. For example, referring back to the illustration above, because data point 403-1 is inside the class corresponding to the predetermined image style 403, its distance is closest, thereby triggering the similarity score to be the highest. The class or predetermined image style next closest to the data point 403-1 (or the predetermined image style 403 itself) may be the predetermined image style 405. Accordingly, image style 403 may be scored second highest below 403.

In some embodiments, in response to the determining of the distance between the first one or more indications of the one or more predetermined image effects and a second one or more indications of the one or more features of the one or more portions, the one or more portions are classified (e.g., according to the labeling described with respect to block 702 of FIG. 7) based at least in part on the training of the machine learning model (e.g., block 708 of FIG. 7). For example, referring to the same example above, the data point 403-1 can be classified as the "hyperfuse" predetermined image style 403 based on its distance to the class. As described herein, the "hyperfuse" predetermined image style 403 may have been given this label prior to training in some embodiments. However, in other embodiments, they are not given labels prior to training. In this way, some embodiments make a determination of the image style of the one or more portions based on the nearest neighbor using a deep neural network. In some embodiments, a "scoring means" (e.g., the scoring component 107) generates the similarity score.

As described herein, particular embodiments quantify a given image style into an embedding (e.g., the data point 403-1) using a deep neural network and then use this embedding to find the closest matching predetermined image style(s) that can generate similar image styles. Accordingly, embodiments can identify the closest predetermined image styles that can generate a style similar to the image style of the one or more portions of the target image. This is different than existing neural transfer or image style transfer techniques. While neural style transfer generates styled content using forward pass through neural network layers (or generate styled content using backpropagation over the image), various embodiments of the present disclosure embed an image style (or image effect) into a feature vector, which is then used to look for similar (e.g., within a threshold distance) predetermined image styles that can apply the given predetermined image style to a source image.

Per block 811, various embodiments cause presentation of an indication of at least one predetermined image based at least in part on the similarity score. For example, embodiments cause presentation of the indication of the "hyperfuse" predetermined image style 315 (or 403) to the screenshot 300-3 based on the "hyperfuze" predetermined image style 403 having a higher score that the predetermined image style 409, as illustrated in the feature space 400 of FIG. 4. Some embodiments rank each predetermined image style of a plurality of predetermined image styles based at least in part on the generating of the similarity score. For example, referring back to FIG. 4, some embodiments rank the "hyperfuze" predetermined image style 403 higher than the predetermined image style 409 based on the "hyperfuze" predetermined image style 403 being closer to the data point 403-1 (representing the feature vector of the extracted features) than the predetermined image style 409. In some embodiments, this ranking includes functionality as described above with respect to the ranking component 109 of FIG. 9. Based at least in part on the ranking of each predetermined image style, particular embodiments present, to a computer device associated with a user, an indication of at least one predetermined image style of the plurality of predetermined image styles. For example, using the illustration above from FIG. 4, based on the "hyperfuze" predetermined image style 403 being ranked higher than the predetermined image style 409, particular embodiments present the "hyperfuse" predetermined image style 403 to a computing device (instead of the predetermined image style 409), as illustrated for example, in FIG. 3C and FIG. 3D. In some embodiments, this "ranking" described above occurs by a "ranking means" (e.g., the ranking component 109).

In a similar manner, particular embodiments also present, to a computer device associated with a user, a representation of at least one predetermined image effect, which is also described by this same example, where the predetermined image style 403 is scored higher than the predetermined image style 409 and accordingly present the predetermined image style 403 but not the predetermined image style because the score is higher for the predetermined image style 409.

Some embodiments present, to the computing device, each predetermined image style of the plurality of predetermined image style in a position that indicates the ranking. For example, a top ranked predetermined image style can be oriented at a top-most (and/or left-most) portion of a results page, while a lowest ranked predetermined image style can be oriented at a bottom-most (and/or right-most) portion of the results page. In some embodiments, "position" is additionally or alternatively indicative of a highlighting, coloring, or otherwise making higher ranked predetermined image style more prominent or conspicuous. In an illustrative example of these embodiments, referring back to FIG. 4, some embodiments rank the "hyperfuze" predetermined image style 403 the highest (e.g., because it is closest to the data point 403-1, which is the image style feature vector of the target image), rank the "dynamize" predetermined image style 405 just below "hyperfuse" 403 (based on the distance) and rank "allure" 407 last (based on allure 407 being furthest away to the data point 403-1). Accordingly, for example, alternative to the presentation currently illustrated in the UI element 313 of FIG. 3C, the indication "hyperfuse" would be oriented at the top of the element 313, the indication "dynamize" would be oriented in the middle, and an "allure" indication would be oriented at the bottom or below "allure," or otherwise indicate to the user that the "similar action" have a ranked order based on their specific quantity of similarity.

In some embodiments, the presenting at block 811 is performed by functionality as described with respect to the presentation component 120. In some embodiments the presentation component 120 corresponds to a "presentation means" such that embodiments present, to a computing device associated with a user, an indication of at least one predetermined image style of the plurality of predetermined image styles based at least in part on the ranking of each predetermined image style.

As described herein, some of the processes herein, such as the process 800 may include more or less blocks than depicted. For instance some embodiments include a further block where embodiments receive a user request associated with the user to apply that at least one predetermined image style to a source image. For example, this is described by the functionality as described with respect to FIG. 3C and FIG. 3D, where the consumer application receives a user selection of the "hyperfuse" indication 315 and responsively applies the "hyperfuse" predetermined image style to the source image 311 to arrive at the new source image 311-1. This is also described in FIG. 2 where the consumer application(s) 215 apply the image style transfer to the source image 219. This is also described with respect to the image style transfer component 130 of FIG. 1. In some embodiments, the source image has already been uploaded to a consumer application, such as a web application (as opposed to a locally installed application that does not interface with the web).

In some embodiments, the at least one predetermined image style that is presented per block 811 includes a plurality of sub-image styles. Some embodiments receive a user request to modify (e.g., add) a first sub-image style of the plurality of image styles. In response to the receiving of the user request, some embodiments modify the first sub-image style of the plurality of sub-image styles. For example, referring back to FIG. 3D, in response to embodiments applying or superimposing the "hyperfuse" predetermined image style to the source image 311 to arrive at a final source image 311-1, embodiments can receive a user request to delete one of the layers of the source image 311-1 via the UI element 317 and responsively execute the UI request. For instance, embodiments can receive a user request to modify the "wavy lines" layer under the "hyperfuze" predetermined image effect indicated in the UI element 317.

Because particular predetermined image styles (e.g., PHOTOSHOP actions) use various features (e.g., brushes, adjustment layers, masking, etc.), users can modify individual steps or processes of a predetermined image style to modify the source image both globally and locally. For example, the user may want to focus more on the subject and modify details while the global style of the predetermined image style remains the same. Particular embodiments apply predetermined image styles in a procedural manner as opposed to directly manipulating the pixels of neural style transfer techniques. Thus, particular embodiments allows users to apply filters or effects at much higher resolution and also allows them to adjust and customize the final artwork or source image.

As described herein, the outputs of a neural style transfer algorithm (e.g., AdaIN) on some content images are global in nature and does not allow users to adjust artistic effects of the image style transfer. However, using particular embodiments (e.g., the layer modification component 140), users can manipulate or adjust individual predetermined image effect layers to get the desired image effect.

As described herein, certain embodiments use the feature of a pre-trained neural network lie CGG to jointly optimize the content and style loss between the generated image and the original and style image respectively. While the content loss is mainly the Euclidian distance between the output features of a pre-trained VGG network, the style loss is generally determined by some statistics over these features. Various embodiments described herein do no propose a new style transfer algorithm. Instead, some embodiments classify different complex image styles (e.g., the artistic styles obtained by running different predetermined image styles on an image (e.g., a target image), independent of its content. These embodiments can be efficiently used to learn any arbitrary style distribution and also generalize well to unseen styles (e.g., features extracted from the target image).

In general, users can navigate through products (e.g., image style of a target image) and embodiments can show an image (e.g., one or more predetermined image styles) with similar artistic effects or image effects as image style features of the products. As described herein, some embodiments use deep learning to extract relevant features (embeddings) from these products and using these features to search a corpus of the predetermined image styles, which can then be applied to the user's target image to produce the desired artistic effect.

Exemplary Operating Environments

Figure 9:
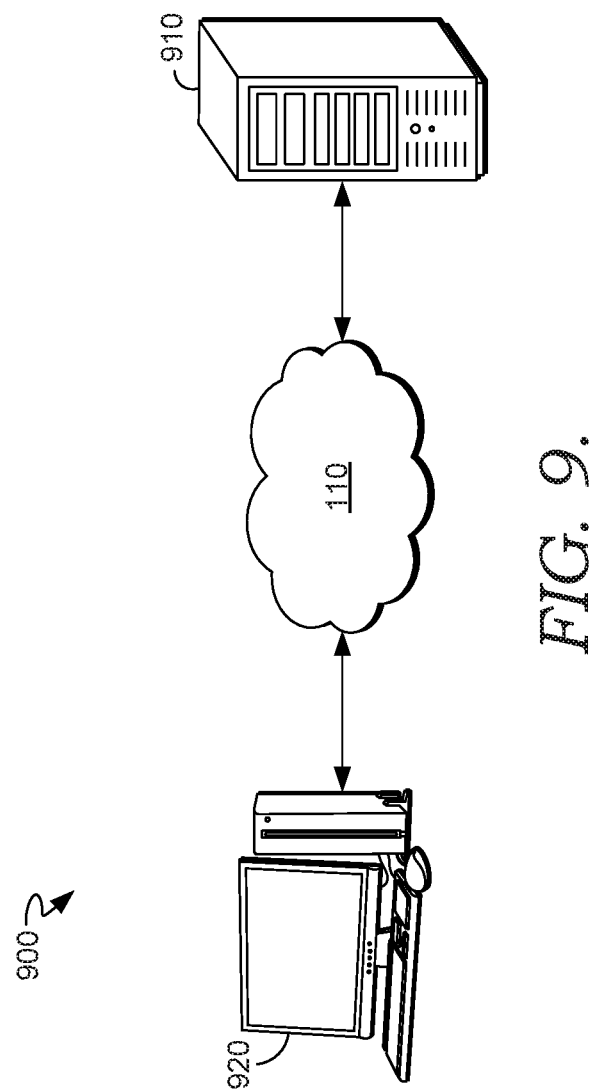
FIG. 9 is an example computer environment in which aspects of the present disclosure are employed, according to some embodiments.

Turning now to FIG. 9, a schematic depiction is provided illustrating an example computing environment 900 for generating a similarity score and applying a predetermined image style to a source image, in which some embodiments of the present invention may be employed. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. For example, there may be multiple servers 910 that represent nodes in a cloud computing network. Various functions described herein as being performed by one or more entities may be carried out by hardware, firmware, and/or software. For instance, various functions may be carried out by a processor executing instructions stored in memory.

The environment 900 depicted in FIG. 9 includes a prediction server ("server") 910 that is in communication with a network 110. The environment 900 further includes a client device ("client") 920 that is also in communication with the network 110. Among other things, the client 920 can communicate with the server 910 via the network 110, and generate for communication, to the server 910, a request to make a detection, prediction, or classification of one or more instances of a document/image. The request can include, among other things, a document with content order values. In various embodiments, the client 920 is embodied in a computing device, which may be referred to herein as a client device or user device, such as described with respect to the computing device 1000 of FIG. 10.

In some embodiments, each component in FIG. 1 or FIG. 2 is included in the server 910 and/or the client device 920.

Alternatively, in some embodiments, the components of FIG. 1 or 2 are distributed between the server 910 and client device 920.

The server 910 can receive the request communicated from the client 920, and can search for relevant data via any number of data repositories to which the server 910 can access, whether remotely or locally. A data repository can include one or more local computing devices or remote computing devices, each accessible to the server 910 directly or indirectly via network 110. In accordance with some embodiments described herein, a data repository can include any of one or more remote servers, any node (e.g., a computing device) in a distributed plurality of nodes, such as those typically maintaining a distributed ledger (e.g., block chain) network, or any remote server that is coupled to or in communication with any node in a distributed plurality of nodes. Any of the aforementioned data repositories can be associated with one of a plurality of data storage entities, which may or may not be associated with one another. As described herein, a data storage entity can include any entity (e.g., retailer, manufacturer, e-commerce platform, social media platform, web host) that stores data (e.g., names, demographic data, purchases, browsing history, location, addresses) associated with its customers, clients, sales, relationships, website visitors, or any other subject to which the entity is interested. It is contemplated that each data repository is generally associated with a different data storage entity, though some data storage entities may be associated with multiple data repositories and some data repositories may be associated with multiple data storage entities. In various embodiments, the server 910 is embodied in a computing device, such as described with respect to the computing device 1000 of FIG. 10.

Figure 10:
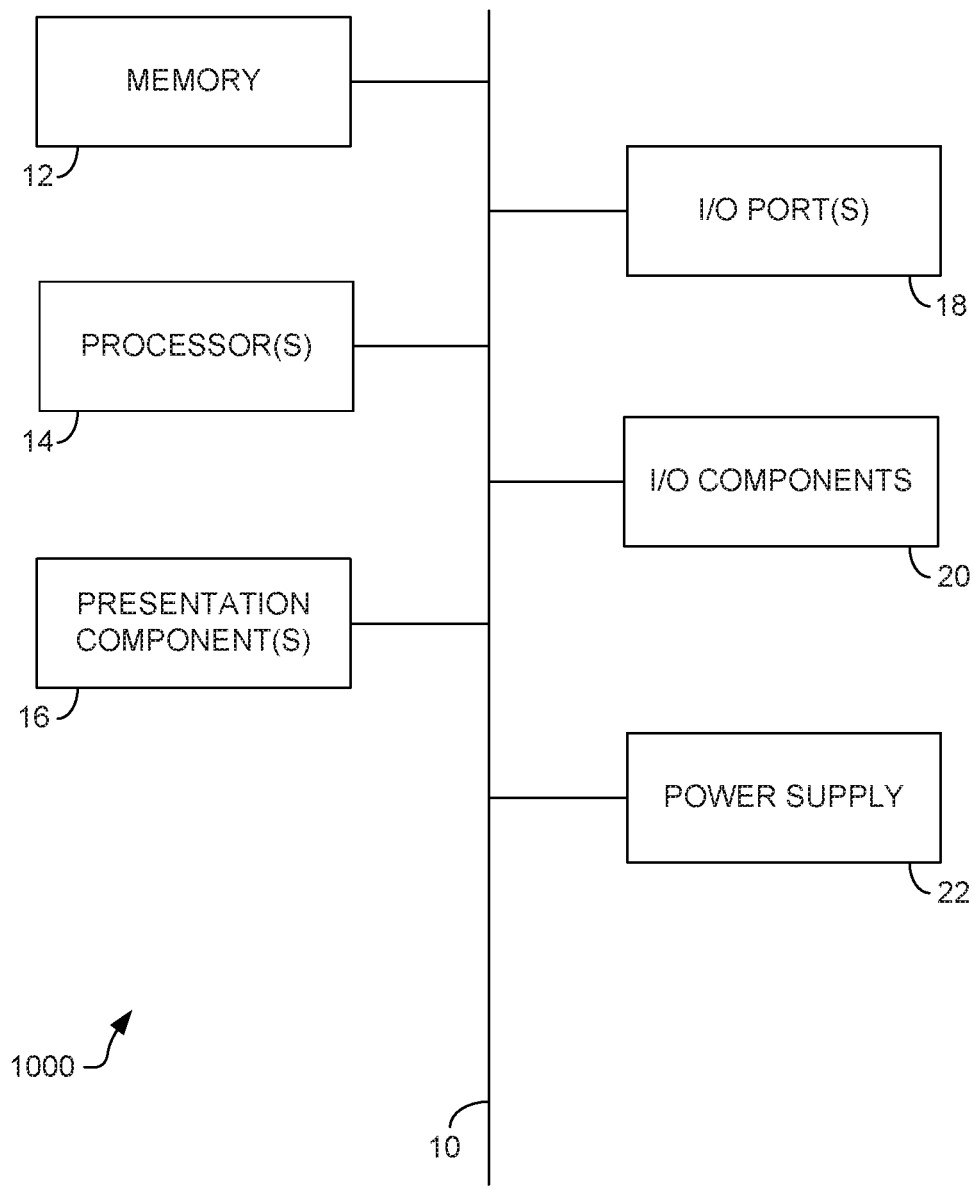
FIG. 10 is a block diagram of a computing device in which aspects of the present disclosure employ, according to some embodiments.

Having described embodiments of the present invention, an exemplary operating environment in which embodiments of the present invention may be implemented is described below in order to provide a general context for various aspects of the present invention. Referring initially to FIG. 10 in particular, an exemplary operating environment for implementing embodiments of the present invention is shown and designated generally as computing device 1000. Computing device 1000 is but one example of a suitable computing environment and is not intended to suggest any limitation as to the scope of use or functionality of the invention. Neither should the computing device 1000 be interpreted as having any dependency or requirement relating to any one or combination of components illustrated.

Looking now to FIG. 10, computing device 1000 includes a bus 10 that directly or indirectly couples the following devices: memory 12, one or more processors 14, one or more presentation components 16, input/output (I/O) ports 18, input/output components 20, and an illustrative power supply 22. Bus 10 represents what may be one or more busses (such as an address bus, data bus, or combination thereof). Although the various blocks of FIG. 10 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 10 is merely illustrative of an exemplary computing device that can be used in connection with one or more embodiments of the present invention. Distinction is not made between such categories as "workstation," "server," "laptop," "hand-held device,"

etc., as all are contemplated within the scope of FIG. 10 and reference to "computing device."

Computing device 1000 typically includes a variety of computer-readable media. Computer-readable media can be any available media that can be accessed by computing device 1000 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1000. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media. In various embodiments, the computing device 1000 represents the client device 920 and/or the server 910 of FIG. 9.

Memory 12 includes computer-storage media in the form of volatile and/or nonvolatile memory. The memory may be removable, non-removable, or a combination thereof. Exemplary hardware devices include solid-state memory, hard drives, optical-disc drives, etc. Computing device 1000 includes one or more processors that read data from various entities such as memory 12 or I/O components 20. Presentation component(s) 16 present data indications to a user or other device. Exemplary presentation components include a display device, speaker, printing component, vibrating component, etc. In some embodiments, the memory includes program instructions that, when executed by one or more processors, cause the one or more processors to perform any functionality described herein, such as the process 700 of FIG. 7, process 800 of FIG. 8, or any functionality described with respect to FIGS. 1 through 9.

I/O ports 18 allow computing device 1200 to be logically coupled to other devices including I/O components 20, some of which may be built in. Illustrative components include a microphone, joystick, game pad, satellite dish, scanner, printer, wireless device, etc. The I/O components 20 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1000. The computing device 1200 may be equipped with depth cameras, such as stereoscopic camera systems, infrared camera systems, RGB camera systems, touchscreen technology, and combinations of these, for gesture detection and recognition. Additionally, the computing device 1000 may be equipped with accelerometers or gyroscopes that enable detection of motion. The output of the accelerometers or gyroscopes may be provided to the display of the computing device 1000 to render immersive augmented reality or virtual reality.

As can be understood, embodiments of the present invention provide for, among other things, generating proof and attestation service notifications corresponding to a determined veracity of a claim. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub combinations are of utility and may be employed without reference to other features and sub combinations. This is contemplated by and is within the scope of the claims.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A non-transitory computer readable medium storing computer-usable instructions that, when used by one or more processors, cause the one or more processors to perform operations comprising:
    receiving one or more portions of a target image;
    extracting one or more features from the one or more portions of the target image, the one or more features correspond to an image style of the one or more portions, wherein the one or more features do not correspond to content of the target image;
    comparing the one or more features with a plurality of predetermined image styles;
    based on the comparing, generating a similarity score for each predetermined image style of the plurality of image styles, the similarity score is indicative of a measure of similarity between the one or more features and each predetermined image style of the plurality of predetermined image styles;
    based at least in part on the generating of the similarity score, ranking each predetermined image style of the plurality of predetermined image styles; and
    based at least in part on the ranking of each predetermined image style, causing presentation, to a computing device associated with a user, an indication of at least one predetermined image style of the plurality of predetermined image styles.

2. The non-transitory computer readable medium of claim 1, wherein the operations further comprising receiving a user request associated with the user to apply the at least one predetermined image style to a source image.

3. The non-transitory computer readable medium of claim 1, wherein the receiving of the one or more portions of the target image occurs in response to a user request to locate a predetermined image style that is similar to an image style of the one or more portions of the target image.

4. The non-transitory computer readable medium of claim 1, wherein the operations further comprising receiving a user request associated with the user to apply the at least one predetermined image style to a source image, and wherein the at least one predetermined image style includes a plurality of sub-image styles, the operations further comprising:
receiving a user request to modify a first sub-image style of the plurality of image styles; and
in response to the receiving of the user request, modify the first sub-image style of the plurality of image styles.

5. The non-transitory computer readable medium of claim 1, wherein the generating of the similarity score includes determining, in feature space, a distance between a feature vector representing the one or more portions of the target image and other feature vectors representing and the plurality of predetermined image styles, wherein the distance represents the similarity score.

6. The non-transitory computer readable medium of claim 1, wherein a determination of the image style of the target image includes using a deep neural network.

7. The non-transitory computer readable medium of claim 1, the operations further comprising causing presentation, to the computing device, each predetermined image style of the plurality of predetermined image styles in a position that indicates the ranking.

8. The non-transitory computer readable medium of claim 1, the operations further comprising:
receiving, prior to the receiving of the one or more portion of the target image, a label for each image of a plurality of images, each label indicating one of the predetermined image styles;
extracting image style features from the plurality of images;
identifying training sets for the plurality of images; and
training a machine learning model based at least in part on learning weights associated with the image style features.

9. The non-transitory computer readable medium of claim 1, wherein the one or more portions of the target image is a sub-portion of the target image selected by a user.

10. A computer-implemented method comprising:
receiving one or more portions of a target image;
extracting one or more features from the one or more portions, the one or more features corresponding to one or more image effects of the one or more portions;
determining a distance between a first one or more indications representing one or more predetermined image effects and a second one or more indications representing the one or more features;
based at least in part on the determining of the distance, generating a similarity score for the one or more predetermined image effects; and
based at least in part on the generating of the similarity score, causing presentation, to a computing device associated with a user, a representation of at least one predetermined image effect.

11. The computer-implemented method of claim 10, further comprising receiving a user request associated with the user to apply the at least one predetermined image effect to a source image uploaded to a web application.

12. The computer-implemented method of claim 10, wherein the receiving of the one or more portions of the target image occurs in response to a user request to locate a predetermined image effect that is similar to an image style of the one or more portions of the target image.

13. The computer-implemented method of claim 10, further comprising receiving a user request associated with the user to apply the at least one predetermined image effect to a source image, and wherein the at least one predetermined image effect includes a plurality of sub-image effects, the operations further comprising:
receiving a user request to add a first sub-image effect to the at least one predetermined image effect; and
in response to the receiving of the user request, add the first sub-image effect to the at least one predetermined image effect.

14. The computer-implemented method of claim 10, wherein the first one or more indications of the one or more predetermined image effects represent a first set of feature vectors oriented in vector space and the second one or more indications of the one or more features represent a second feature vector oriented in the vector space, and wherein the determining of the distance includes determining a Euclidian distance between each of the first set of feature vectors and the second feature vector.

15. The computer-implemented method of claim 10, wherein the determining of the distance includes using a deep neural network.

16. The computer-implemented method of claim 10, further comprising:
receiving, prior to the receiving of the one or more portion of the target image, a label for each image of a plurality of images, each label indicating a plurality of predetermined image styles;
selecting features from a plurality of images;
identifying training sets of the plurality of images; and
training a machine learning model based at least in part on learning weights associated with the image style features.

17. The computer-implemented method of claim 16, further comprising in response to the determining of the distance between the first one or more indications of the one or more predetermined image effects and a second one or more indications of the one or more features of the one or more portions, classifying the one or more portions according to the labelling based at least in part on the training of the machine learning model.

18. The computer-implemented method of claim 10, wherein the one or more portions of the target image is an entirety of the target image selected by the user.

19. A computerized system, the system comprising:
an image style extracting means for extracting one or more image style features of a target image;
a scoring means for generating a similarity score for each predetermined image style of a plurality of image styles, the similarity score is indicative of a measure of similarity between the image style features of the target image and each predetermined image style of the plurality of predetermined image styles;
a ranking means for ranking each predetermined image style of the plurality of predetermined image styles based at least in part on the generating of the similarity score; and a presentation means for causing presentation, to a computing device associated with a user, an indication of at least one predetermined image style of the plurality of predetermined image styles based at least in part on the ranking of each predetermined image style.

20. The system of claim 19, further comprising a layer modification means for modifying one or more layers of the at least one predetermined image style on a source image.

\* \* \* \* \*